US 10,685,591 B2

(12) United States Patent
Koo et al.

(10) Patent No.: US 10,685,591 B2
(45) Date of Patent: Jun. 16, 2020

(54) DISPLAY DEVICE COMPRISING A MAGNETIC GENERATOR FOR CONTROLLING THE POSITION OF A PORTION OF THE DISPLAY SURFACE

(71) Applicant: Samsung Display Co., Ltd., Yongin-Si, Gyeonggi-Do (KR)

(72) Inventors: Ja Hun Koo, Asan-si (KR); Hak Sun Kim, Seoul (KR); Kyung-Hun Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/376,036

(22) Filed: Apr. 5, 2019

(65) Prior Publication Data

US 2019/0236991 A1    Aug. 1, 2019

Related U.S. Application Data

(62) Division of application No. 15/238,476, filed on Aug. 16, 2016, now abandoned.

(30) Foreign Application Priority Data

Jan. 26, 2016  (KR) .................... 10-2016-0009381

(51) Int. Cl.
*G09G 3/00* (2006.01)
*G02F 1/133* (2006.01)
(Continued)

(52) U.S. Cl.
CPC .............. *G09G 3/003* (2013.01); *G02B 27/22* (2013.01); *G02F 1/133* (2013.01); *G06F 1/1652* (2013.01);
(Continued)

(58) Field of Classification Search
CPC ........ G06F 3/044; G06F 3/045; G06F 3/0488; G06F 3/04883; G06F 3/04886
See application file for complete search history.

(56) References Cited

U.S. PATENT DOCUMENTS 6,002,184 A * 12/1999 Delson .................. H02K 23/00
                                                        273/148 R
7,990,374 B2    8/2011 Itkowitz et al.
(Continued)

FOREIGN PATENT DOCUMENTS

CN      101713878 A    5/2010
JP      2013-174738 A  9/2013
(Continued)

OTHER PUBLICATIONS

Ahn et al., Journal of the Korean Society for Precision Engineering 28(11), Nov. 2011, 1234-1241 (8 pages).
(Continued)

*Primary Examiner* — Kent W Chang
*Assistant Examiner* — Nathaniel P Brittingham
(74) *Attorney, Agent, or Firm* — Innovation Counsel LLP

(57) ABSTRACT

The present disclosure is related to a display device including: a display panel including a display surface displaying an image; and a morphing driver disposed at an opposite side of the display surface of the display panel and physically controlling a height of the display surface in a first direction which is substantially perpendicular to the display surface according to depth information of input image data, wherein the morphing driver comprises at least one among a piezoelectric film, an electroactive polymer, and a magnetic generator.

8 Claims, 26 Drawing Sheets

(51) Int. Cl.
*G02B 27/22* (2018.01)
*G06F 1/16* (2006.01)
*G09G 3/20* (2006.01)
*H04N 13/393* (2018.01)
*G02F 1/1333* (2006.01)

(52) U.S. Cl.
CPC ......... *G09G 3/2092* (2013.01); *H04N 13/393* (2018.05); *G02F 1/13336* (2013.01); *G02F 1/133305* (2013.01); *G02F 2001/133394* (2013.01); *G02F 2203/62* (2013.01); *G09G 2380/02* (2013.01)

(56) References Cited

U.S. PATENT DOCUMENTS

| | | | |
|---|---|---|---|
| 2006/0046031 A1 | 3/2006 | Janevski | |
| 2006/0282170 A1 | 12/2006 | Hardwick et al. | |
| 2008/0147239 A1 | 6/2008 | Chiang et al. | |
| 2008/0170936 A1* | 7/2008 | Den Toonder | B01F 13/0059 415/140 |
| 2009/0002328 A1 | 1/2009 | Ullrich et al. | |
| 2009/0072662 A1* | 3/2009 | Sadler | G06F 3/016 310/319 |
| 2009/0128503 A1 | 5/2009 | Grant et al. | |
| 2009/0315690 A1* | 12/2009 | Hwang | G06F 1/1626 340/407.2 |
| 2010/0156818 A1 | 6/2010 | Burrough et al. | |
| 2010/0212762 A1* | 8/2010 | Den Toonder | B01F 13/0059 137/803 |
| 2010/0231367 A1 | 9/2010 | Cruz-Hernandez et al. | |
| 2010/0231550 A1 | 9/2010 | Cruz-Hernandez et al. | |
| 2010/0250071 A1 | 9/2010 | Pala et al. | |
| 2010/0328053 A1 | 12/2010 | Yeh et al. | |
| 2011/0018695 A1 | 1/2011 | Bells et al. | |
| 2011/0163946 A1 | 7/2011 | Tartz et al. | |
| 2011/0216013 A1 | 9/2011 | Siotis | |
| 2011/0248916 A1 | 10/2011 | Griffin et al. | |
| 2011/0260984 A1 | 10/2011 | Paleczny | |
| 2011/0261021 A1 | 10/2011 | Modarres et al. | |
| 2012/0229420 A1* | 9/2012 | Liu | G06F 3/041 345/174 |
| 2013/0002584 A1 | 1/2013 | Leem et al. | |
| 2013/0249975 A1 | 9/2013 | Davie et al. | |
| 2014/0071117 A1 | 3/2014 | Schuckle et al. | |
| 2014/0082489 A1 | 3/2014 | Park | |
| 2014/0098075 A1 | 4/2014 | Kwak et al. | |
| 2014/0125471 A1* | 5/2014 | Organ | G06F 3/016 340/407.2 |
| 2014/0139436 A1* | 5/2014 | Ramstein | H01L 41/0986 345/168 |
| 2014/0232679 A1 | 8/2014 | Whitman et al. | |
| 2014/0247240 A1 | 9/2014 | Sinclair et al. | |
| 2014/0320431 A1 | 10/2014 | Cruz-Hernandez et al. | |
| 2014/0320436 A1 | 10/2014 | Modarres et al. | |
| 2014/0327604 A1 | 11/2014 | Oyama et al. | |
| 2014/0333573 A1* | 11/2014 | Hong | G06F 3/016 345/174 |
| 2014/0362014 A1 | 12/2014 | Ullrich et al. | |
| 2015/0116260 A1* | 4/2015 | Hoen | G06F 3/0414 345/174 |
| 2015/0145657 A1 | 5/2015 | Levesque et al. | |
| 2015/0222886 A1 | 8/2015 | Bathiche et al. | |
| 2015/0227204 A1* | 8/2015 | Gipson | G06F 3/016 345/156 |
| 2015/0279010 A1 | 10/2015 | Cianfrone | |
| 2015/0315687 A1* | 11/2015 | Poole | B22F 1/00 428/596 |
| 2016/0133034 A1* | 5/2016 | Son | G06F 3/016 345/174 |
| 2016/0306426 A1 | 10/2016 | Modarres et al. | |
| 2017/0213488 A1 | 7/2017 | Koo et al. | |
| 2018/0066636 A1 | 3/2018 | Khoshkava et al. | |
| 2018/0096570 A1* | 4/2018 | Khoshkava | H01F 7/0226 |
| 2018/0224926 A1 | 8/2018 | Harviainen et al. | |

FOREIGN PATENT DOCUMENTS

| | | |
|---|---|---|
| KR | 10-0274624 B1 | 12/2000 |
| KR | 10-1235273 B1 | 2/2013 |

OTHER PUBLICATIONS

Ahn et al., The Transaction of the Korean Institute of Electrical Engineers C 51C(3), Mar. 2002, 125-133 (9 pages).

* cited by examiner

FIG. 2
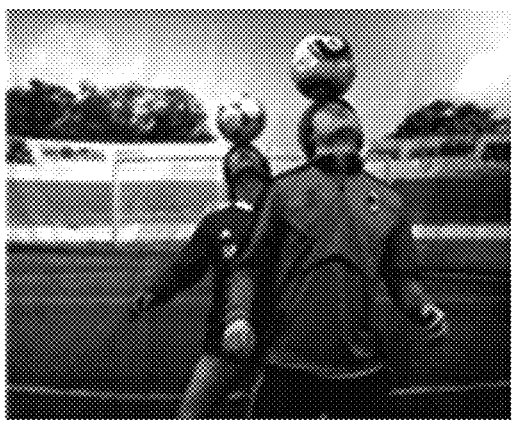
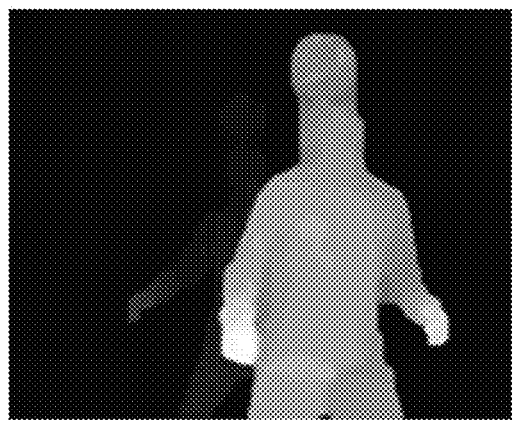
[IMG]      [DEP]

DISPLAY DEVICE COMPRISING A MAGNETIC GENERATOR FOR CONTROLLING THE POSITION OF A PORTION OF THE DISPLAY SURFACE

CROSS-REFERENCE TO RELATED APPLICATION

This application is a divisional application of U.S. patent application Ser. No. 15/238,476 filed on Aug. 16, 2016, which claims priority under 35 USC § 119 to Korean Patent Application No. 10-2016-0009381 filed on Jan. 26, 2016 in the Korean Intellectual Property Office, the disclosures of which are incorporated herein in their entirety by reference.

BACKGROUND (a) Technical Field

The present inventive concept relates to a display device. More particularly, the present inventive concept relates to a display device that can represent a stereoscopic effect of 3D images physically and realistically.

(b) Description of the Related Art

In a field of technology for displaying 3D (3-dimensional) images, the stereoscopic effect of an object is represented by using binocular disparity, which is the most significant factor for realizing a stereoscopic effect. To generate binocular disparity, in general, respective 2D images that are different from each other are recognized by the left eye and the right eye of an observer, the image recognized by the left eye (hereinafter referred to as "left-eye image") and the image recognized by the right eye (hereinafter referred to as "right-eye image") are transmitted to the brain. Then, the left-eye image and the right-eye image transmitted to the brain are combined with each other to be perceived as a 3D image providing depth perception.

The representative 3D image display device includes a stereoscopic 3D image display device, which uses glasses for the left eye and the right eye to recognize different 2D images from each other, such as shutter glasses and polarizing glasses, and a non-stereoscopic 3D image display device, which does not use glasses but uses an optical system such as a lenticular lens or a parallax barrier that is disposed in front of a display panel.

The stereoscopic 3D image display device, however, has drawbacks like inconvenience of wearing glasses, decrease in luminance due to the glasses, dizziness, etc. For the non-stereoscopic 3D image display device using an optical system such as lenticular lenses or a parallax barrier, there may be drawbacks that the number of viewpoints is limited due to the optical system, the viewing angle is reduced, deterioration of stereoscopic effect, degradation of resolution, etc.

The above information disclosed in this Background section is only for enhancement of understanding of the background of the inventive concept and therefore it may contain information that does not form the prior art that is already known in this country to a person of ordinary skill in the art.

SUMMARY

The present disclosure is for providing a display device that does not have such drawbacks of a stereoscopic 3D image display device or a non-stereoscopic 3D image display device using an optical system in the prior art, and provides a physical and realistic stereoscopic effect.

A display device according to an embodiment includes: a display panel including a display surface displaying an image; and a morphing driver disposed at an opposite side of the display surface of the display panel and physically controlling a height of the display surface in a first direction which is substantially perpendicular to the display surface according to depth information of input image data, wherein the morphing driver comprises at least one among a piezoelectric film, an electroactive polymer, and a magnetic generator.

The morphing driver may include a plurality of morphing units respectively corresponding to a plurality of portions of the display panel, and each of the plurality of morphing units may control the height of the display surface according to the depth information.

A morphing unit of the plurality of morphing units may include: a first driving electrode receiving a depth data voltage corresponding to the depth information; and a morphing member connected with the first driving electrode and transformed according to the depth data voltage.

The morphing member may include portions having different degrees of transformation when the depth data voltage is applied to the first driving electrode.

When the depth data voltage is applied to the first driving electrode, a degree of bending of an edge portion of the morphing member may be greater than a degree of bending of a middle portion of the morphing member.

When the depth data voltage is applied to the first driving electrode, a degree of bending of a middle portion of the morphing member may be greater than a degree of bending of an edge portion of the morphing member.

In an original state in which the depth data voltage is not applied to the first driving electrode, the morphing member may extend mainly in a direction perpendicular to the first direction.

In an original state in which the depth data voltage is not applied to the first driving electrode, the morphing member may extend mainly in the first direction.

The morphing driver and the display panel may be adhered to each other.

The first driving electrode may contact a first surface of the morphing member, and the one morphing unit may further include a second driving electrode which contacts and is connected to a second surface opposite to the first surface, and is supplied with a common voltage.

The morphing driver may include a plurality of data lines transmitting the depth data voltage, and a plurality of gate lines transmitting gate signals, and the morphing unit may include a switching element which includes an input terminal connected with one of the plurality of data lines, a gate terminal connected with one of the plurality of gate lines, and an output terminal connected with the first driving electrode.

When the first driving electrode is supplied with the depth data voltage, a length of the morphing member in the first direction may vary according to the depth data voltage.

When the length of the morphing member in the first direction is elongated, a width of the morphing member in a second direction perpendicular to the first direction may decrease.

The morphing driver and the display panel may be adhered to each other. A plurality of the morphing members included in at least two adjacent ones of the morphing units may be connected with each other.

The magnetic generator may generate a magnetic field which has a polarity and intensity according to the depth information, and each of the plurality of morphing units may include the magnetic generator.

The display panel may include a first magnetic element generating a magnetic field toward the morphing driver.

The magnetic generator may include a charging element, a resistor, a coil, and a power element, and the charging element, the resistor, the coil, and the power element together may constitute a circuit.

The power element may output a voltage which is about a half of a chargeable maximum voltage of the charging element.

The morphing driver may include a plurality of data lines transmitting the depth data voltage, and a plurality of gate lines transmitting a gate signal.

The display device may further include a second magnetic element opposing the display panel with reference to the morphing driver, wherein the second element generates a magnetic field toward the display panel.

A 3D display device according to an embodiment of the present disclosure can represent a physical and realistic stereoscopic effect so that the quality of the stereoscopic effect perceived by an observer can be improved.

BRIEF DESCRIPTION OF THE DRAWINGS

FIG. 2 shows an example of image information and depth information of input image data input to a display device according to an exemplary embodiment.

DETAILED DESCRIPTION OF THE EMBODIMENTS

Figure 1:
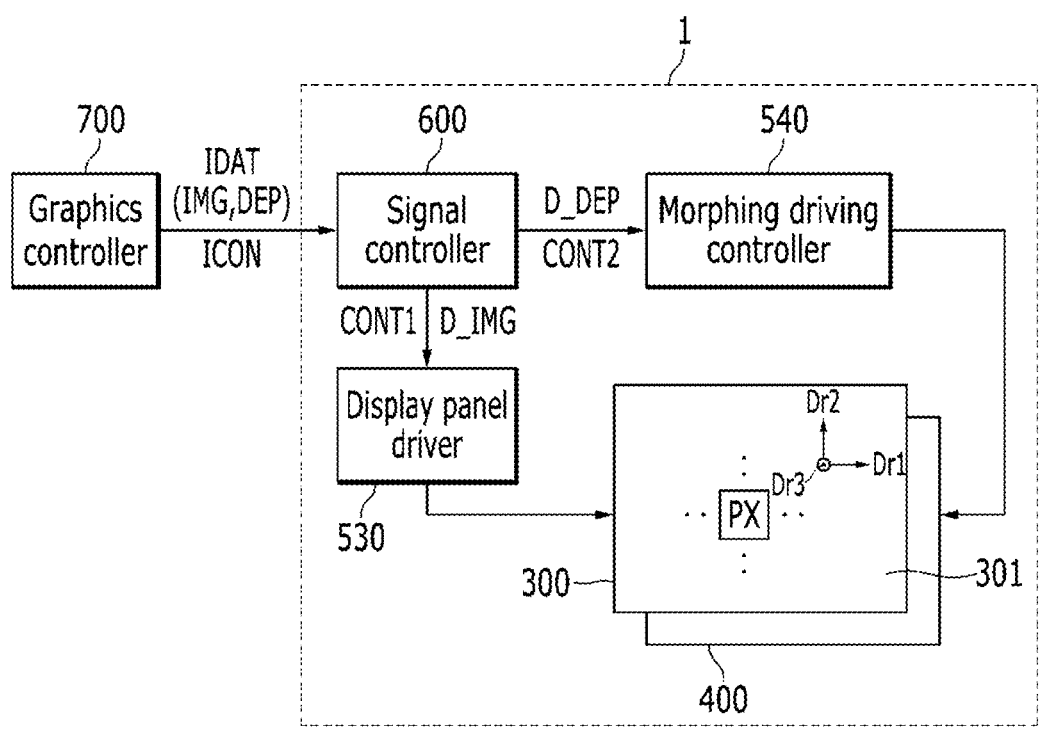
FIG. 1 is a block diagram of a display device according to an exemplary embodiment.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

First, referring to FIG. 1 to FIG. 5, a display device according to an exemplary embodiment will now be described.

Figure 3:
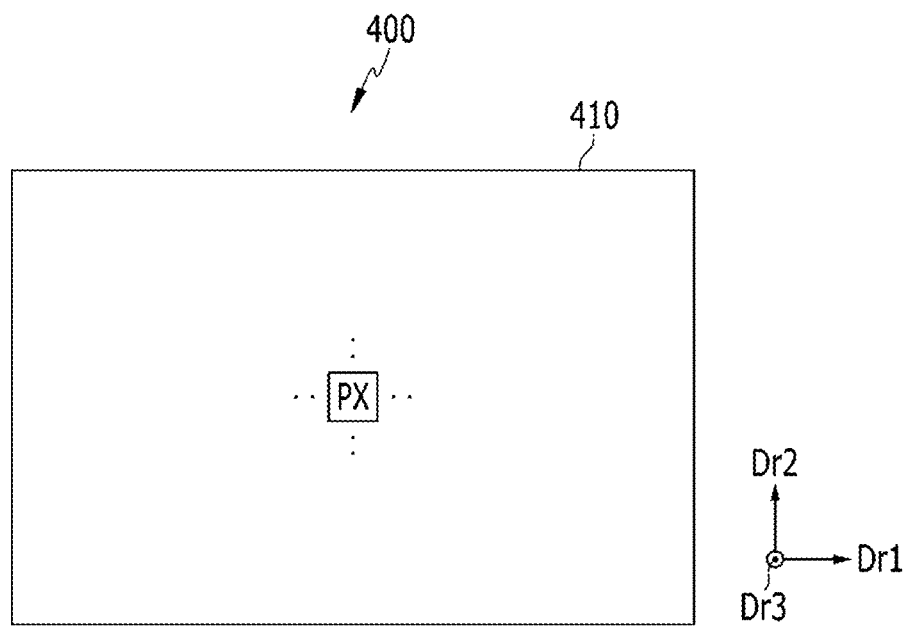
FIG. 3, FIG. 4, and FIG. 5 are each a top plan view that simply shows a morphing driver of a display device according to an exemplary embodiment.
Figure 4:
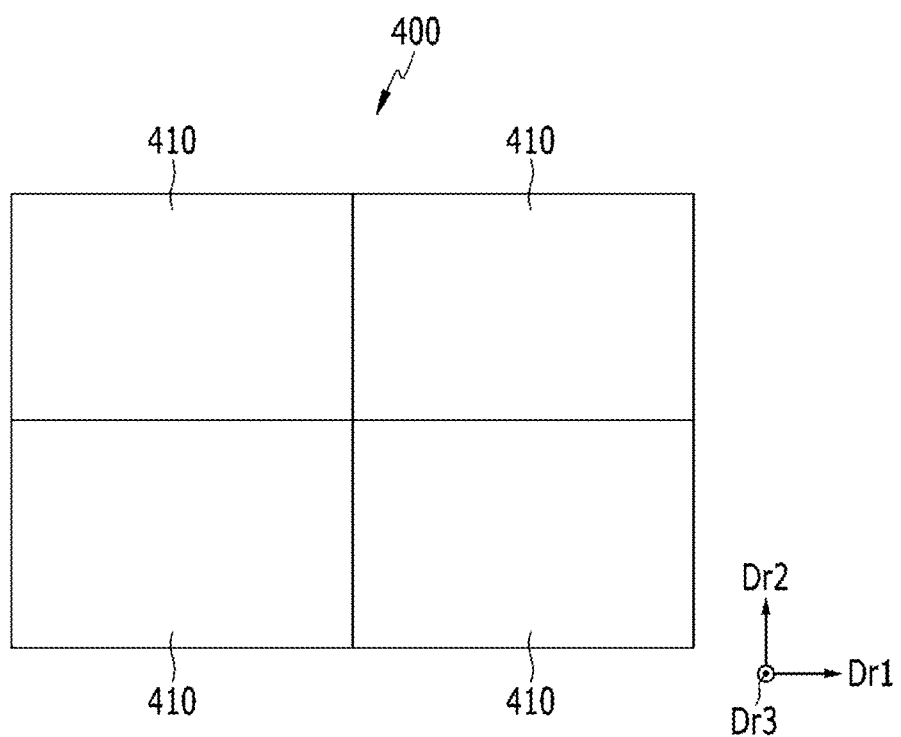
Figure 5:
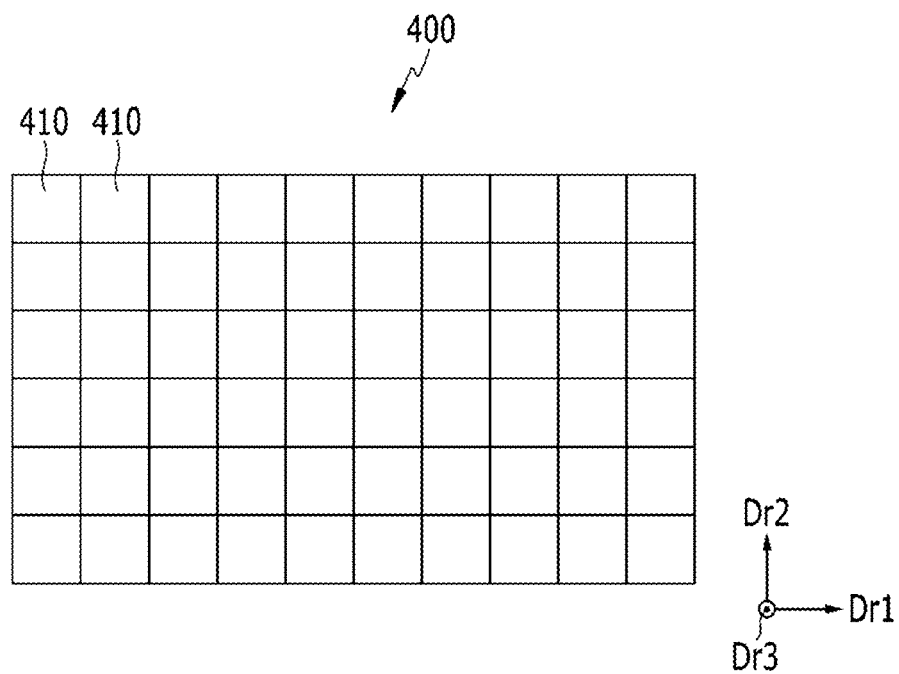

FIG. 1 is a block diagram of a display device according to an exemplary embodiment, FIG. 2 shows an example of image information and depth information of input image data input to a display device according to an exemplary embodiment, and FIG. 3, FIG. 4, and FIG. 5 are each a top plan view that simply shows a morphing driver of a display device according to an exemplary embodiment.

Referring to FIG. 1, a display device 1 according to an exemplary embodiment includes a display panel 300, a morphing driver 400, a signal controller 600, a display panel driver 530, and a morphing driving controller 540.

The display panel 300, which is a panel for displaying images, includes a display surface 301 on which the image is displayed. The display panel 300 may display an image by emitting light within a predetermined viewing angle with reference to a direction Dr3 through the display surface 301. The viewing angle at which the image can be observed may be equal to or less than about 90 degrees, or may be greater than about 90 degrees and equal to or less than about 180 degrees, at a side with reference to the direction Dr3. At least a portion of the display surface 301 may be curved, and the curved form may be substantially maintained regardless of driving of the display panel 300.

The display surface 301, which is a surface crossing the direction Dr3, may include at least a portion that is parallel to a first direction Dr1 and a second direction Dr2 that are perpendicular to the direction Dr3. For example, most of the display surface 301 may be parallel to the first direction Dr1 and the second direction Dr2, but the inventive concept is not limited thereto. Hereinafter, the direction Dr3 is referred to as a third direction Dr3.

The display panel 300 includes a plurality of signal lines and a plurality of pixels PX connected with the plurality of signal lines.

The signal lines may include a plurality of gate lines transmitting a gate signal and a plurality of data lines transmitting data voltages.

The plurality of pixels PX may be arranged in a matrix form, but are not limited thereto. Each pixel PX, as a unit that displays image information, may represent image information corresponding to a primary color such as red, green, and blue. The display panel 300 may display an image of a targeted color with a spatial or temporal sum of the primary colors displayed by the pixels PX.

The display panel 300 may be a flexible display panel, and in particular, may be a stretchable display panel that has elasticity. Therefore, the display panel 300 is elastic and has a characteristic that it can be stretched like a rubber band when being pulled, and reduced to its original state when being released. The display panel 300 may be transformed or morphed to be convex or concave in the third direction Dr3 as shown in FIG. 1 or in an opposite direction of the third direction Dr3. The state in which the display panel 300 is not transformed is referred to as an original state, in comparison to the state in which the display panel 300 is transformed in the third direction Dr3. In the original state, the display surface 301 may be substantially flat, but the inventive concept is not limited thereto as explained above.

The detailed configuration and structure for displaying images of the display panel 300 is not limited and may be various. For example, the display panel 300 may be a liquid crystal panel including a liquid crystal layer that can control polarization of incident light, a light emitting display panel including an emission layer, or a plasma display panel (PDP) using plasma. In a case that the display panel 300 is a non-emissive display panel, the display panel 300 may include at least one light source.

The signal controller 600 receives input image data IDAT and an input control signal ICON for controlling display of the input image data IDAT from a graphics controller 700. The graphics controller 700 may be referred to as a graphics processing unit (GPU), and the graphics controller 700 may be included in the display device 1, differently from as shown in FIG. 1.

The input image data IDAT have luminance information, and the luminance may have a predetermined number of grays. The input image data IDAT may include 2D image data for displaying 2D images or 3D image data for displaying 3D images. In the case that the input image data IDAT includes 3D image data, the input image data IDAT includes image information IMG and depth information DEP. The display device 1 according to an exemplary embodiment may display a 2D image or a 3D image according to a selected mode. Hereinafter, the description is mainly related to the case that the mode is a 3D mode for displaying a 3D image.

Referring to FIG. 2, the image information IMG is information about an image displayed through the display surface 301 of the display panel 300. The image information IMG may include color information of an image, and grayscale information for respective primary colors. The image information IMG may be 2D image data.

The depth information DEP represents information on a depth of the image information IMG, which is a degree that a surface of an object protrudes toward the observer or is depressed away from the observer at each portion of the image to be displayed by the display panel 300, which is referred to as "depth". The depth information DEP may include depth surface information representing a degree of depth of an object of an image to be displayed, which is referred to as "depth map". Each point on the depth surface information may be represented by respective 3D coordinates based on the depth information DEP and 2D position information.

The depth information DEP may be represented as a 2D image corresponding to the image information IMG, as shown on the right part of FIG. 2. In this case, the depth information DEP may be represented as a higher gray level when the object is disposed close to the observer. The resolution of the depth information DEP may be the same as the resolution of the image information IMG, or may be lower than the resolution of the image information IMG. In the case that the resolution of the depth information DEP is equal to the resolution of the image information IMG, depth information DEP corresponding to all pixels PX may be presented.

The input control signal ICON may include a vertical synchronization signal, a horizontal synchronization signal, a main clock signal, a data enable signal, etc. for displaying an image.

The signal controller 600 controls the display panel driver 530 and the morphing driving controller 540. The signal controller 600 processes the input image data IDAT adequately for the operating conditions of the display panel 300 and the morphing driver 400, based on the input image data IDAT including the image information IMG and the depth information DEP, and the input control signal ICON, and generates an output image signal D_IMG and a first control signal CONT1 for controlling output of the output image signal D_IMG and generates an output depth signal D_DEP and a second control signal CONT2 for controlling output of the output depth signal D_DEP. The output image signal D_IMG is generated based on the image information IMG, and the output depth signal D_DEP is generated based on the depth information DEP. The signal controller 600 outputs the output image signal D_IMG and the first control signal CONT1 to the display panel driver 530, and outputs the output depth signal D_DEP and the second control signal CONT2 to the morphing driving controller 540.

The display panel driver 530 generates driving signals such as a data voltage and a gate signal based on the output image signal D_IMG and the first control signal CONT1, and applies such driving signals to signal lines such as gate lines and data lines of the display panel 300. Accordingly, the display panel 300 may display an image corresponding to the image information IMG or the output image signal D_IMG.

The morphing driver 400 is disposed behind an opposite surface to the display surface 301 of the display panel 300, and overlaps and faces the display panel 300 in the third direction Dr3. When the morphing driver 400 is not operated, the display panel 300 may be in the original state in which the display panel 300 is not transformed. If the morphing driver 400 receives the driving signal from the morphing driving controller 540 and operates accordingly, the position in the third direction Dr3, that is, the height in the third direction Dr3, of the respective portion of the display panel 300 corresponding to the depth information DEP or the output depth signal D_DEP, may be physically and realistically represented according to the depth information DEP or the output depth signal D_DEP. Accordingly, positions or heights in the third direction Dr3 of the display surface 301 of the display panel 300 can be controlled.

The morphing driver 400 may independently control positions in the third direction Dr3 of a plurality of corresponding portions of the display panel 300. The number of portions of the display panel 300 at which the positions in the third direction Dr3 can be independently controlled is referred to as a morphing resolution.

The morphing driver 400 and the display panel 300 may be adhered to each other, or may be separated from each other. Further, any other constituent element may not exist between the morphing driver 400 and the display panel 300, or another constituent element may be interposed between the morphing driver 400 and the display panel 300. For example, an assistant member (not shown) for the morphing driver 400 to easily transform or morph the display panel 300 may be inserted between the morphing driver 400 and the display panel 300.

The morphing driving controller 540 generates a driving signal based on the output depth signal D_DEP, and applies the driving signal to the morphing driver 400. The driving signal input to the morphing driver 400 includes a gate signal and a depth data voltage to be input to the morphing driver 400. The depth data voltage input to the morphing driver 400 is a voltage obtained by converting the output depth signal D_DEP. The depth data voltage may be obtained by selecting a voltage among a plurality of levels of voltage according to the output depth signal D_DEP during conversion. The number of levels represented by the output depth signal D_DEP may be equal to or different from the number of levels of the depth data voltage. The number of depth data voltages may vary depending on conditions of the morphing driver 400. For example, even if the number of levels of the depth information DEP or the output depth signal D_DEP is 1024, the number of morphing levels that can be represented by the morphing driver 400 may be less than 1024. In this case, the morphing driving controller 540 may further include a lookup table (not shown), which matches levels of the depth information DEP or the output depth signal D_DEP and levels of the depth data voltages input to the morphing driver 400.

The depth data voltage input to the morphing driver 400 may have a positive polarity or a negative polarity with reference to a common voltage, which will be explained later, or may be the same as the common voltage.

Referring to FIG. 3, the morphing driver 400 may include at least one morphing unit 410, and the morphing resolution may be determined according to the number of morphing units 410 included in the morphing driver 400.

Different morphing units 410 may respectively correspond to different portions of the display panel 300. One morphing unit 410 may correspond to at least one pixel PX of the display panel 300. The morphing driver 400 according to an embodiment as shown in FIG. 3 include the morphing unit 410, and the morphing unit 410 may be disposed corresponding to all of the pixels PX that display an image in the display panel 300.

FIG. 4 shows an example in which the morphing driver 400 includes four morphing units 410. FIG. 5 shows an example in which the morphing driver 400 includes sixty morphing units 410, but the number of morphing units 410 may be less or more than the number shown in FIG. 5. The plurality of morphing units 410 are arranged in a plane which is parallel to the first direction Dr1 and the second direction Dr2, and each of the plurality of morphing units 410 corresponds to a respective portion of the display panel 300.

A size in a plan view of each of the plurality of morphing units 410 may be uniform as shown in FIG. 4 or FIG. 5, or alternatively, at least two of the morphing units 410 may have different sizes from each other. The size in a plan view, here, refers to a size in a plane parallel to both of the first direction Dr1 and the second direction Dr2.

Different ones of the morphing units 410 independently control positions in the third direction Dr3 of the respective corresponding portions of the display panel 300 according to the depth information DEP or the output depth signal D_DEP. Thus, when an observer observes an image displayed by the display panel 300, the display surface 301 is protruded toward the observer, or depressed backward, or maintains the original position, and as a result, the observer can perceive a physical and realistic stereoscopic effect. In other words, the depth information DEP is converted to a height of the display surface 301 depending on the position on a plane of the display panel 300. Accordingly, the depth information DEP may be represented physically and realistically on the display surface 301. Also, the observer does not feel drawbacks such as dizziness when watching a 3D display device as in the prior art, but may perceive a high quality stereoscopic effect.

Now, referring to FIG. 6 to FIG. 10 along with drawings explained above, a detailed structure of a morphing driver 400 according to an exemplary embodiment is described.

Figure 6:
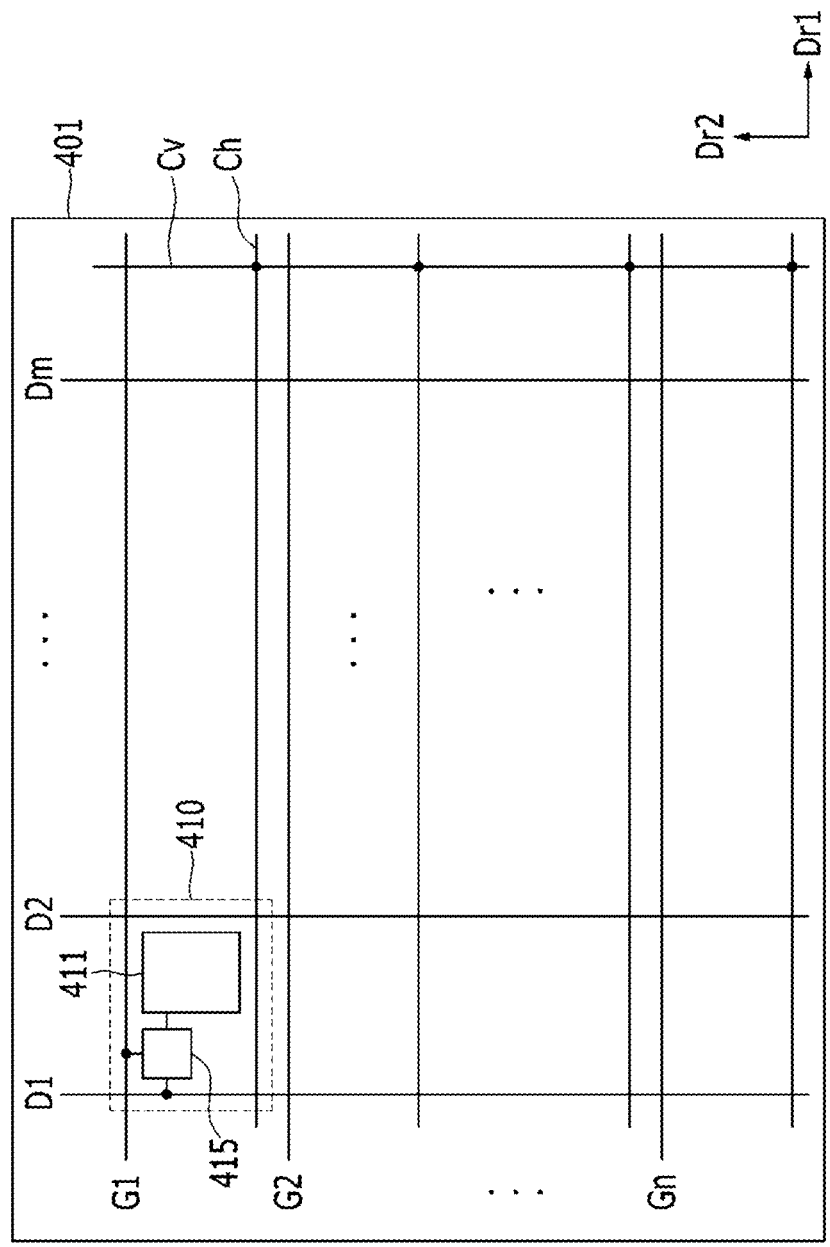
FIG. 6 is a plan layout view of various signal lines and elements connected thereto included in a morphing driver of a display device according to an exemplary embodiment.
Figure 7:
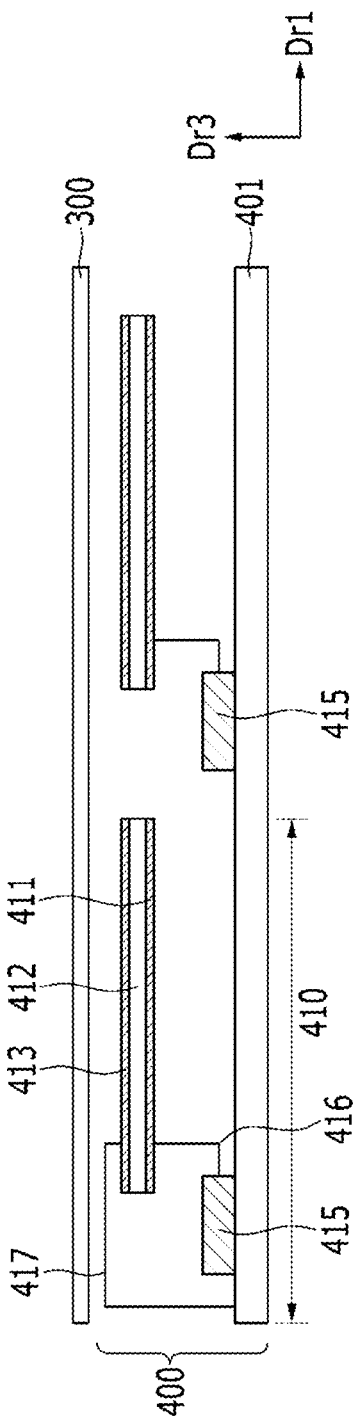
FIG. 7 is a cross-sectional view of a morphing driver and a display panel corresponding to the morphing driver according to an exemplary embodiment.
Figure 8:
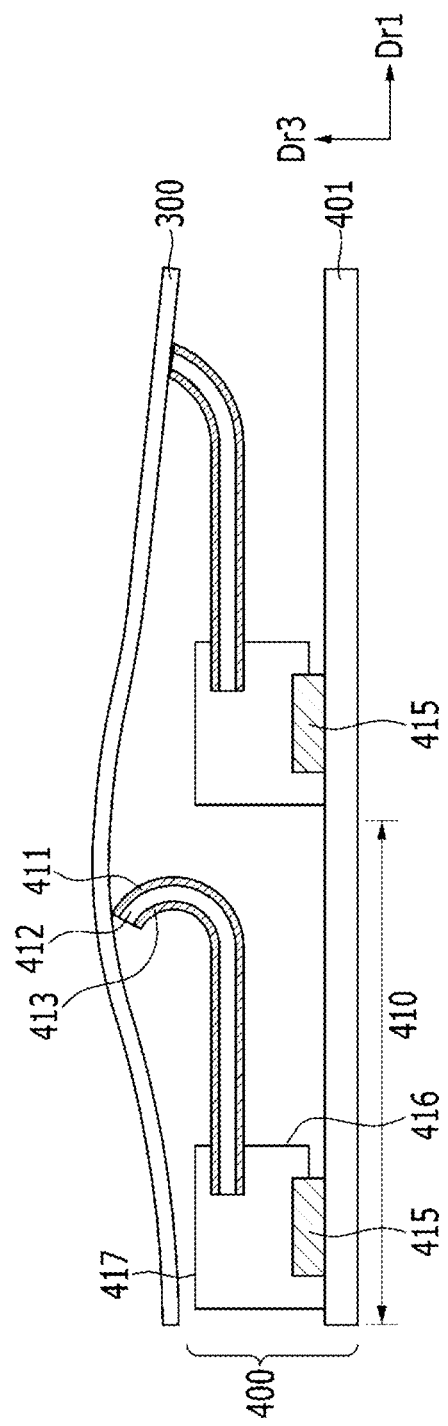
FIG. 8, FIG. 9, and FIG. 10 are each a drawing that shows a state of a display panel that is transformed by a morphing driver according to an exemplary embodiment as shown in FIG. 7.
Figure 9:
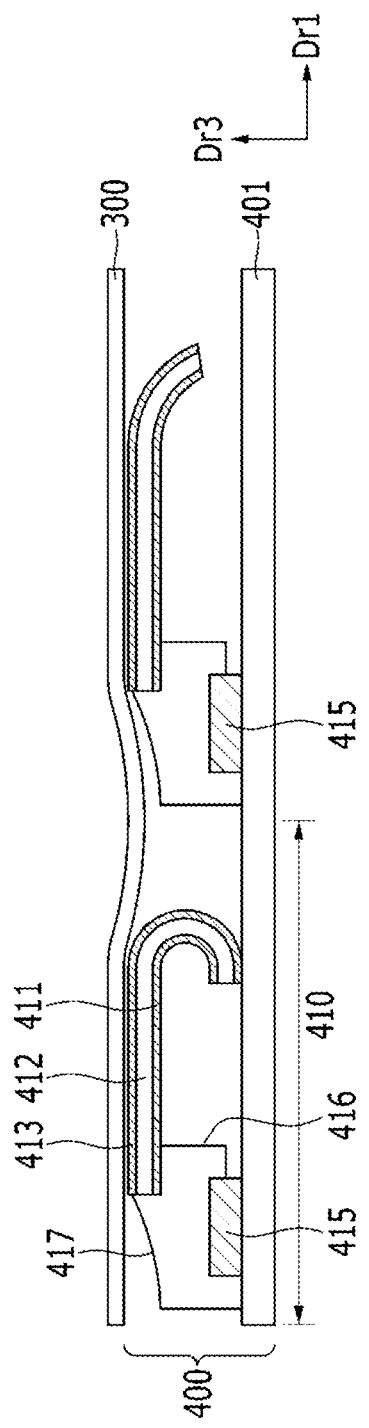
Figure 10:
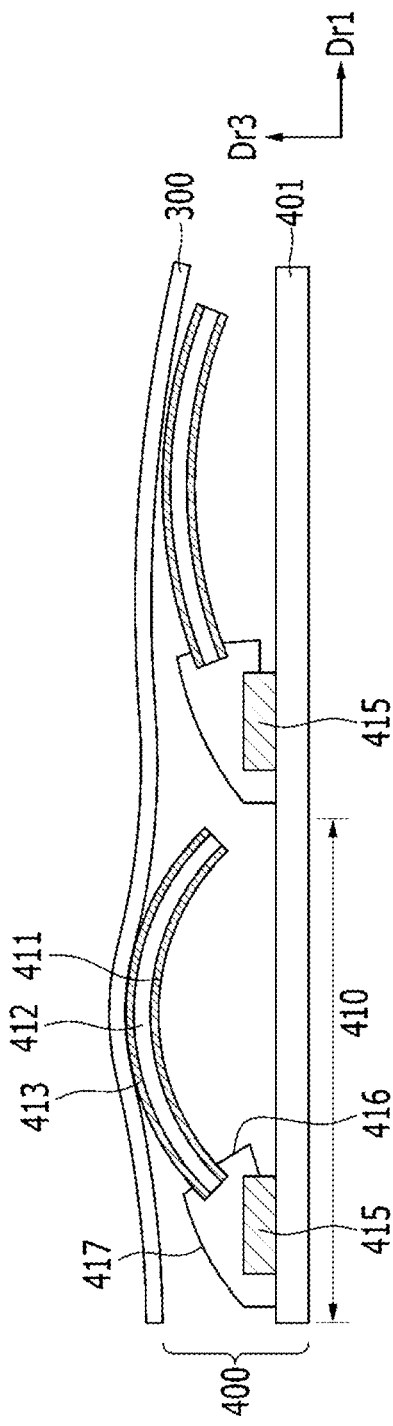

FIG. 6 is a plan layout view of various signal lines and elements connected thereto included in a morphing driver of a display device according to an exemplary embodiment, FIG. 7 is a cross-sectional view of a morphing driver and a display panel corresponding to the morphing driver according to an exemplary embodiment, and FIG. 8, FIG. 9, and FIG. 10 are each a drawing that shows a state of a display panel that is transformed by a morphing driver according to an exemplary embodiment as shown in FIG. 7.

Referring to FIG. 6, the morphing driver 400 according to an exemplary embodiment includes a plurality of signal lines including a plurality of gate lines G1-Gn and a plurality of data lines D1-Dm, a plurality of switching elements 415 connected with the signal lines, and a plurality of first driving electrodes 411. The morphing unit 410 may include a first driving electrode 411 as shown in FIG. 6, but the inventive concept is not limited thereto.

The plurality of gate lines G1-Gn may extend in the first direction Dr1 as an example, and the plurality of data lines D1-Dm may extend in a direction crossing the plurality of gate lines G1-Gn, that is, in the second direction Dr2. The gate lines G1-Gn may transmit a gate signal among the driving signals input from the morphing driving controller 540, and the data line D1-Dm may transmit the depth data voltage among the driving signals input from the morphing driving controller 540.

The morphing driver 400 may further include common voltage lines Ch and Cv transmitting a common voltage. The common voltage may be constant or may vary with time. The common voltage lines Ch and Cv may include at least one horizontal common voltage line Ch extending in the first direction Dr1, and at least one vertical common voltage line Cv extending in the second direction Dr2. The horizontal common voltage line Ch and the vertical common voltage line Cv may be electrically connected to each other. At least one among the horizontal common voltage line Ch and the vertical common voltage line Cv may be omitted.

Referring to FIG. 6 and FIG. 7, the switching element 415 may be disposed on a substrate 401. Though not shown in detail, the switching element 415 may be a thin film transistor including a plurality of thin films disposed on the substrate 401. Each of the switching elements 415 may include a gate terminal connected with at least one of the gate lines G1-Gn, an input terminal connected with at least one of the data lines D1-Dm, and an output terminal connected with the first driving electrode 411. The switching element 415 may be switched on or off according to a gate signal transmitted from the gate line G1-Gn, and a depth data voltage transmitted by the data line D1-Dm may be transmitted to the first driving electrode 411 when the switching element 415 is turned on.

The first driving electrode 411 is connected with each of the switching elements 415, and may be supplied with a depth data voltage from the switching element 415.

The morphing driver 400 includes at least one morphing member 412 connected with the first driving electrode 411. FIG. 7 shows an example in which the morphing driver 400 includes a plurality of morphing members 412. Each morphing member 412 may be disposed in a morphing unit 410. Each morphing member 412 may be connected with a first driving electrode 411, but the inventive concept is not limited thereto. That is, in an alternative example, each morphing member 412 may be connected with a plurality of first driving electrodes. The morphing member 412 may mainly extend in the first direction Dr1 and/or in the second direction Dr2 which are perpendicular to the third direction Dr3.

The first driving electrode 411 may contact a first surface of the morphing member 412 and may be connected with the morphing member 412. FIG. 7 shows an example in which the first driving electrode 411 contacts and is connected with the first surface, which is the lower surface, of the morphing member 412, but the inventive concept is not limited thereto.

As shown in FIG. 7, the first driving electrode 411 may be disposed substantially on an entire area of the first surface of the morphing member 412. Alternatively, the first driving electrode 411 may be disposed only on a portion of the first surface of the morphing member 412.

The first driving electrode 411 may be connected to an output terminal of the switching element 415 via a connecting line 416 which has conductivity.

The morphing driver 400 may further include a plurality of second driving electrodes 413 connected to a second surface of the morphing member 412, wherein the second surface is an opposing surface of the first surface of the morphing member 412 to which the first driving electrode 411 is connected. The second surface may be an upper surface of the morphing member 412 as shown in FIG. 7. The second driving electrode 413 may be electrically connected with the common voltage line Ch or Cv and supplied with a common voltage.

The second driving electrode 413 may contact the second surface of the morphing member 412 and may be connected with the morphing member 412. As shown in FIG. 7, the second driving electrode 413 may be disposed substantially on an entire area of the second surface of the morphing member 412. Alternatively, the second driving electrode 413 may be disposed only on a portion of the second surface of the morphing member 412. In the case that the second driving electrode 413 is disposed only on a portion of the second surface of the morphing member 412 and that the first driving electrode 411 is disposed only on a portion of the first surface of the morphing member 412, the first driving electrode 411 and the second driving electrode 413 may overlap each other in a plan view. Alternatively, the first driving electrode 411 and the second driving electrode 413 may not overlap and respectively disposed at opposing ends of the morphing member 412.

The second driving electrode 413 may be connected to the common voltage line Ch or Cv via a connecting line 417 which has conductivity. The connecting line 417 may be omitted. In this case, the second driving electrode 413 may be directly connected with the common voltage line Ch or Cv.

One first driving electrode 411 and one second driving electrode 413 corresponding to each other may be disposed in a morphing unit 410, and the one first driving electrode 411 and the one second driving electrode 413 may be connected with the morphing member 412. FIG. 7 shows an example in which a morphing member 412 is disposed in each of the plurality of morphing units 410, and adjacent morphing members 412 are separated from each other and spaced apart from each other. However, an exemplary embodiment of the present inventive concept is not limited to this, and the morphing members 412 disposed in the plurality of morphing units 410 may be connected with each other. Even in this case, the first driving electrodes 411 respectively disposed in different morphing units 410 may be electrically disconnected with each other, and the second driving electrodes 413 respectively disposed in different morphing units 410 may be electrically separated from each other.

The shape of the morphing member 412 shown in FIG. 7 is a state in which the morphing driver 400 does not operate, that is, in an original state.

Referring to FIG. 8, when the morphing driver 400 operates by the driving signals according to the depth information DEP or the output depth signal D_DEP, a depth data voltage is transmitted to the first driving electrode 411 of each of the morphing units 410, and the morphing member 412 may be transformed physically. Here, transformation or morphing of the morphing member 412 may mean that the shape of the morphing member 412 changes or is transformed, and further, it may mean that at least one among a shape, a volume, or an area of a surface of the morphing member 412 is changed. Due to such physical transformation or morphing of the morphing member 412, positions or heights in the third direction Dr3 of portions of the display panel 300 that is disposed over the morphing driver 400 changes. Thus, the display surface may have an uneven surface. Therefore, the depth information DEP may be physically and realistically represented on the display surface 301 of the display panel 300, and accordingly, an observer may perceive a realistic stereoscopic effect.

The transformation method of the morphing member 412 may be variously changed.

Particularly, the degree of transformation or morphing for different portions of a morphing member 412 disposed in a morphing unit 410 may be different from each other. For example, if a voltage is applied to a morphing member 412, a middle portion of the morphing member 412 is more transformed than an edge portion of the morphing member 412, or alternatively, a middle portion of the morphing member 412 may be less transformed than an edge portion of the morphing member 412. Various methods for transforming the morphing member 412 will be described referring to the drawings.

For example, referring to FIG. 8, the morphing member 412 supplied with a depth data voltage may be bent because the transformation or morphing degree of the edge portion of the morphing member 412 is greater than that at the middle portion. More particularly, the morphing member 412 may be bent or rolled up in the third direction Dr3 from an edge portion far from the portion connected to the connecting lines 416 and 417.

The greater the difference between the depth data voltage applied to the morphing member 412 and the common voltage is, the greater the transformation or morphing degree of the morphing member 412 is, so that the display panel 300 corresponding to the morphing member 412 may be protruded more in the third direction Dr3. In this case, the applied depth data voltage may have a positive polarity with reference to the common voltage. The depth information DEP for the image displayed by the display panel 300 corresponding to the more transformed morphing member 412 may have a higher level or higher grayscale information.

For example, referring to FIG. 9, the morphing member 412 supplied with a depth data voltage may be bent or rolled down in a direction opposite to the third direction Dr3 from an edge portion far from the portion connected to the connecting lines 416 and 417. The greater the difference between the depth data voltage applied to the morphing member 412 and the common voltage is, the greater the transformation or morphing degree of the morphing member 412 is, so that the display panel 300 corresponding to the morphing member 412 may be more depressed in a direction opposite to the third direction Dr3. In this case, the applied depth data voltage may have a negative polarity with reference to the common voltage. In FIG. 9, the depth information DEP for the image displayed by the display panel 300 corresponding to the more transformed morphing member 412 may have a lower level or lower grayscale information.

In the exemplary embodiment FIG. 9, the display panel 300 may be adhered to the morphing driver 400, particularly the morphing member 412 or the second driving electrode 413 disposed on the morphing member 412, so that the display panel 300 may be easily transformed or morphed according to the depth information DEP. According to this, when the morphing member 412 is transformed in the third direction Dr3 or in a direction opposite to the third direction Dr3, the display panel 300 may be more easily transformed or morphed in the same direction as the transformation direction of the morphing member 412.

Referring to FIG. 10, the middle portion of the morphing member 412 supplied with a depth data voltage may be more transformed and bent than the edge portion of the morphing member 412. In other words, the middle portion of the morphing member 412 supplied with a depth data voltage may be bent or transformed in the third direction Dr3 more than the edge portion of the morphing member 412, and particularly, the middle portion of the morphing member 412 may be bent upward in a convex shape. The greater the difference between the depth data voltage applied to the morphing member 412 and the common voltage is, the greater the transformation or morphing degree of the morphing member 412 is, so that the display panel 300 corresponding to the morphing member 412 may be more pushed up in the third direction Dr3. In this case, the applied depth data voltage may have a positive polarity with reference to the common voltage. In FIG. 10, the depth information DEP for the image displayed by the display panel 300 corresponding to the more transformed morphing member 412 may have a higher level or higher grayscale information.

Even not shown in the drawing, a middle portion of the morphing member 412 supplied with a depth data voltage may be bent downward. The greater the difference between the depth data voltage applied to the morphing member 412 and the common voltage is, the greater the transformation or morphing degree of the morphing member 412 is, so that the display panel 300 corresponding to the morphing member 412 may be more depressed in a direction opposite to the third direction Dr3. In this case, the applied depth data voltage may have a negative polarity with reference to the common voltage. In the present exemplary embodiment, the display panel 300 may be adhered to the morphing driver 400, particularly the morphing member 412 or the second driving electrode 413 disposed on the morphing member 412, so as to better represent the transformation or morphing of the display panel 300 according to the depth information DEP.

Differently from embodiments shown in FIG. 8 to FIG. 10, the morphing member 412 supplied with a voltage may be transformed in various ways. A transforming way of the morphing member 412 may be controlled by adjusting a material characteristic of the morphing member 412, or the position or area where the first driving electrode 411 and the second driving electrode 413 are connected to the morphing member 412.

Next, referring to FIG. 11 to FIG. 14 along with FIG. 6 explained above, a detailed structure of the morphing driver 400 according to an exemplary embodiment will now be described. The same description about the same elements as in the aforementioned exemplary embodiment will be omitted.

Figure 11:
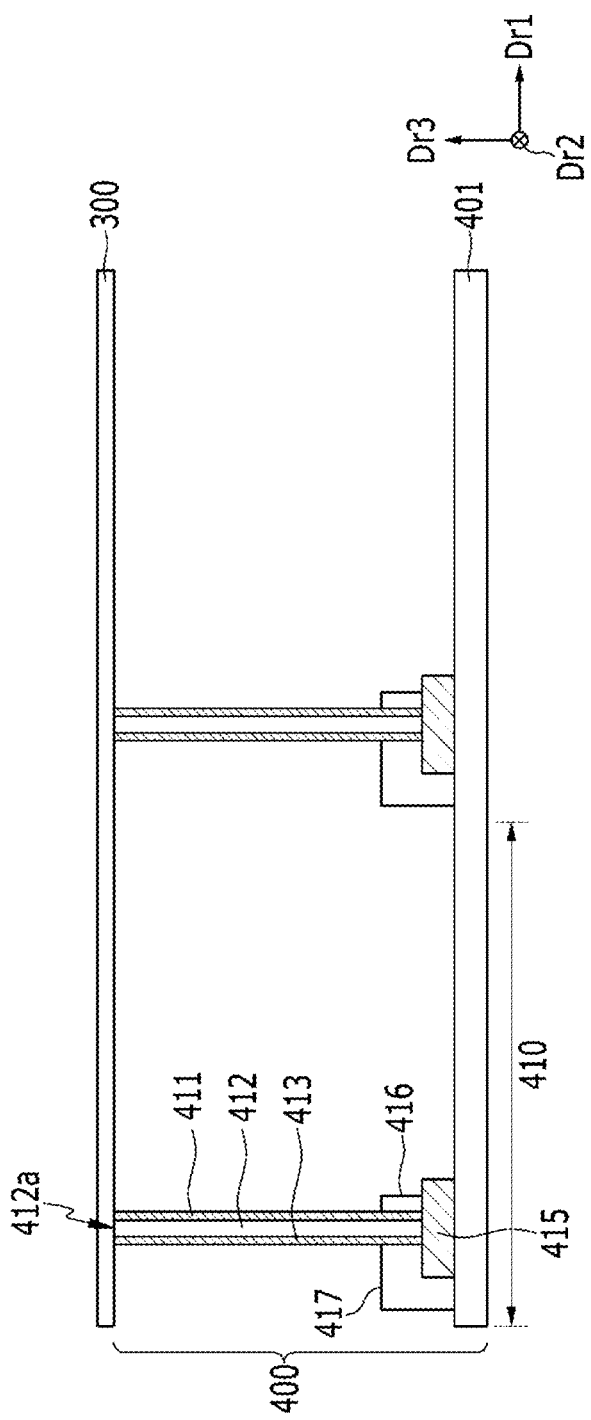
FIG. 11 is a cross-sectional view of a morphing driver and a display panel corresponding to the morphing driver according to an exemplary embodiment.
Figure 12:
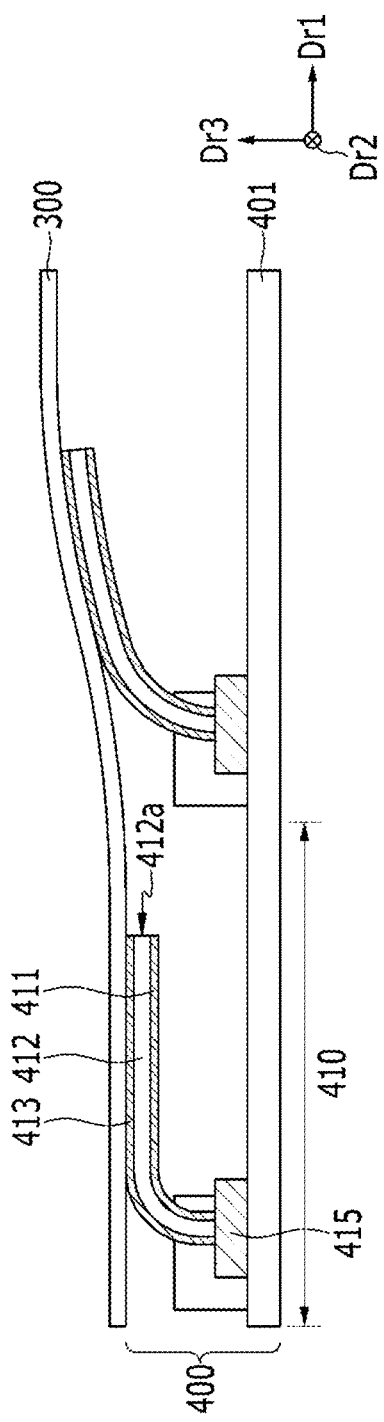
FIG. 12 is a drawing that shows a state of a display panel that is transformed by a morphing driver according to an exemplary embodiment as shown in FIG. 11.
Figure 13:
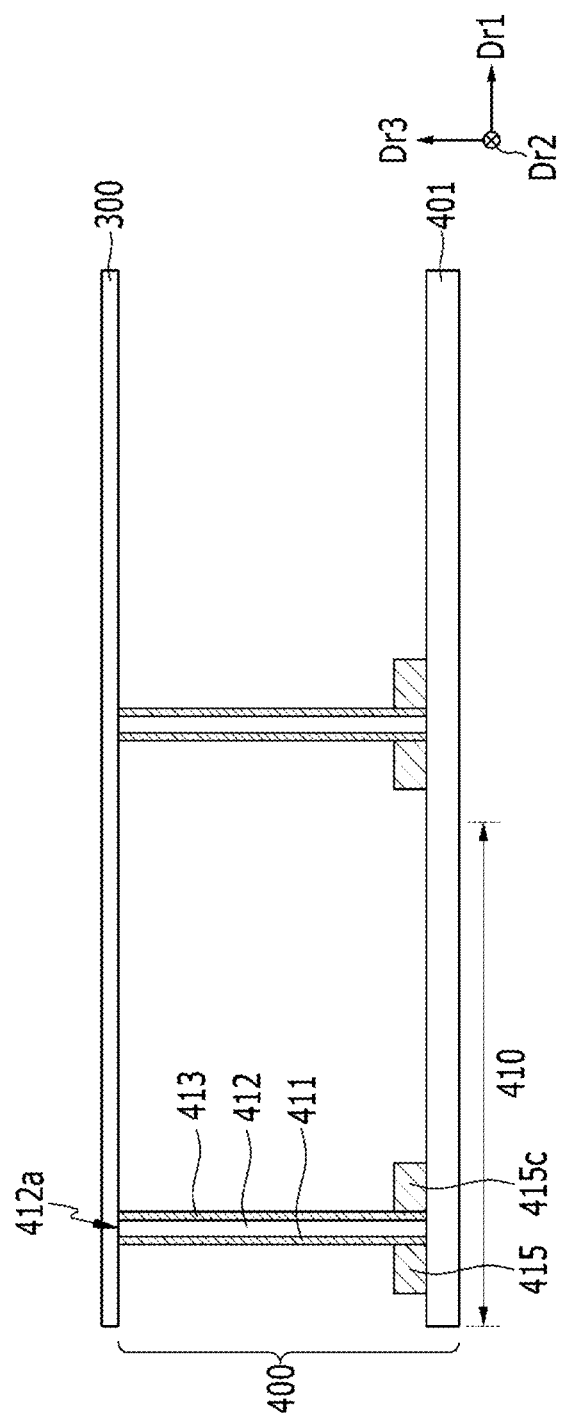
FIG. 13 is a cross-sectional view of a morphing driver and a display panel corresponding to the morphing driver according to an exemplary embodiment.
Figure 14:
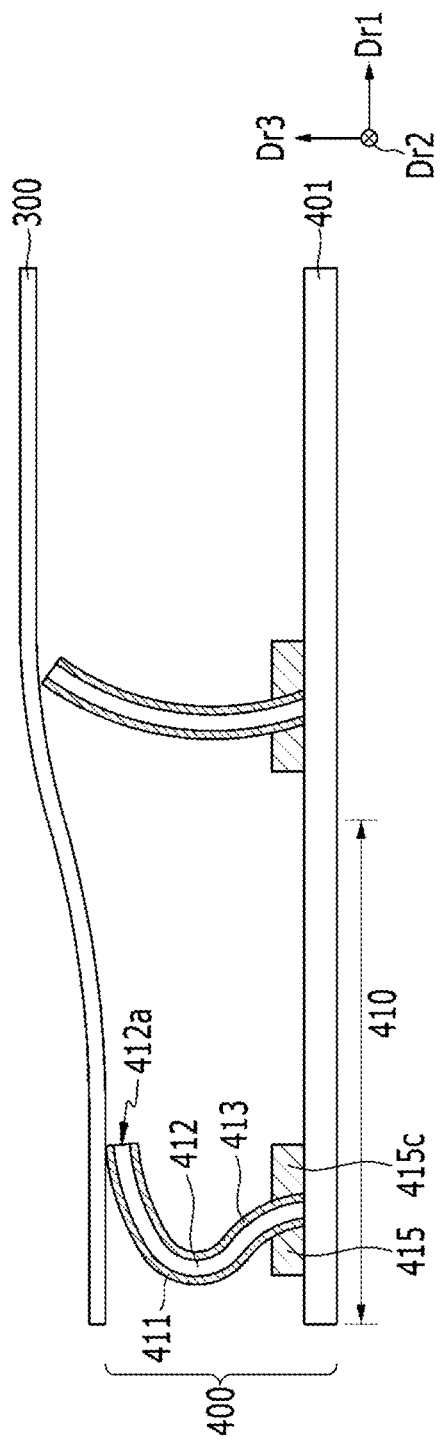
FIG. 14 is a drawing that shows a state of a display panel that is transformed by a morphing driver according to an exemplary embodiment as shown in FIG. 13.

FIG. 11 is a cross-sectional view of a morphing driver and a display panel corresponding to the morphing driver according to an exemplary embodiment, FIG. 12 is a drawing that shows a state of a display panel that is transformed by a morphing driver according to an exemplary embodiment as shown in FIG. 11, FIG. 13 is a cross-sectional view of a morphing driver and a display panel corresponding to the morphing driver according to an exemplary embodiment, and FIG. 14 is a drawing that shows a state of a display panel that is transformed by a morphing driver according to an exemplary embodiment as shown in FIG. 13.

Referring to FIG. 6 and FIG. 11, the switching element 415 may be disposed on the substrate 401.

The morphing driver 400 may include a first driving electrode 411 connected to the switching element 415 to be supplied with a depth data voltage from the switching element 415, and at least one morphing member 412 connected with the first driving electrode 411.

The morphing member 412 may extend mainly in the third direction, or may extend in a direction parallel to a plane formed by the third direction Dr3 and the second direction Dr2.

FIG. 11 shows an example in which the morphing driver 400 includes a plurality of morphing members 412, and a morphing member 412 is disposed in each of the morphing units 410. The first driving electrode 411 may contact a first surface of the morphing member 412 and may be connected with the morphing member. In FIG. 11, the first surface may be the right surface of the morphing member 412, but the inventive concept is not limited thereto, and alternatively, the first surface may be the left surface of the morphing member 412.

The first driving electrode 411 may be connected to an output terminal of the switching element 415 via a connecting line 416 which has conductivity.

The morphing driver 400 may further include a plurality of second driving electrodes 413 connected to a second surface of the morphing member 412, wherein the second surface is an opposing surface of the first surface of the morphing member 412 to which the first driving electrode 411 is connected. In FIG. 11, the second surface may be the left surface of the morphing member 412, but the inventive concept is not limited thereto, and alternatively, the second surface may be the right surface of the morphing member 412. The second driving electrode 413 may be supplied with a common voltage.

The second driving electrode 413 may be connected to the common voltage line Ch or Cv via a connecting line 417 which has conductivity.

The shape of the morphing member 412 shown in FIG. 11 is a state in which the morphing driver 400 does not operate, that is, in an original state. In the original state, the morphing members 412 are arranged to be elongated in the third direction Dr3, so that the upper end portions 412a of each of the morphing members 412 may support the display panel 300 at a uniform height.

Referring to FIG. 12, when the morphing driver 400 operates by the driving signals according to the depth information DEP or the output depth signal D_DEP, a depth data voltage is transmitted to the first driving electrode 411 of each of the morphing units 410, and the morphing member 412 may be transformed physically. Due to such physical transformation or morphing of the morphing member 412, positions or heights in the third direction Dr3 of portions of the display panel 300 that are disposed over the morphing driver 400 may change. Thus, height differences according to positions of the display panel 300 which displays an image are generated.

The transformation method of the morphing member 412 may be variously changed.

For example, referring to FIG. 12, the morphing member 412 supplied with a voltage may be bent toward the first direction Dr1 or in a direction opposite to the first direction Dr1, so the height of an upper end portion 412a of each of the morphing members 412 is lowered, and accordingly, the height of the display panel 300 in the third direction Dr3 corresponding to the upper end portion 412a is lowered. The greater the difference between the depth data voltage applied to the morphing member 412 and the common voltage is, the greater the transformation or morphing degree of the morphing member 412 is, so that the display panel 300 corresponding to the morphing member 412 may be more transformed in a direction opposite to the third direction Dr3. In this case, the applied depth data voltage may have a positive polarity or a negative polarity with reference to the common voltage. The depth information DEP for the image displayed by the display panel 300 corresponding to the morphing member 412 that is transformed more may have a lower level or lower grayscale information.

Referring to FIG. 6 and FIG. 13, the morphing driver 400 according to an embodiment is substantially the same as the aforementioned embodiments, but the morphing driver 400 may further include a common switching element 415c connected with the second driving electrode 413 and disposed on the substrate 401. Though not shown in detail, the common switching element 415c may be a thin film transistor including a plurality of thin films disposed on the substrate 401 like the aforementioned switching element 415. The common switching element 415c may be connected with the gate line to which the switching element 415 is connected and controlled along with the switching element 415, or alternatively, the common switching element 415c may be controlled independently of the switching element 415. The common switching element 415c may include an input terminal electrically connected with the common voltage line Ch or Cv, and an output terminal connected with the second driving electrode 413. The common switching element 415c may be switched on or off according to a gate signal, and a common voltage may be transmitted to the second driving electrode 413 when the common switching element 415c is turned on.

In the exemplary embodiments as shown in FIG. 13, the connecting line which connects the first driving electrode 411 with the switching element 415 is omitted, differently from the embodiments of FIG. 7 to FIG. 12.

Besides the explanation above, various characteristics of the embodiment shown in FIG. 11 may be applied to the embodiment of FIG. 13, and accordingly, the same explanations as in the aforementioned embodiment are omitted.

The shape of the morphing member 412 shown in FIG. 13 is a state in which the morphing driver 400 does not operate, that is, in an original state. In the original state, the morphing member 412 is elongated in the third direction Dr3, and thus, an upper end portion 412a of each morphing member 412 may support the display panel 300 at a uniform height.

Referring to FIG. 14, the middle portion of the morphing member 412 supplied with a voltage may be bent or transformed in the first direction Dr1, and particularly, the middle portion of the morphing member 412 may be bent to the left or to the right in a convex shape. Therefore, the height of the upper end portion 412a of the morphing member 412 is lowered, and accordingly, the height of the display panel 300 corresponding to the upper end portion 412a becomes lower. The greater the difference between the depth data voltage applied to the morphing member 412 and the common voltage is, the greater the transformation or morphing degree of the morphing member 412 is, so that the display panel 300 corresponding to the morphing member 412 may be transformed in a direction opposite to the third direction Dr3. In this case, the applied depth data voltage may have a positive polarity or a negative polarity with reference to the common voltage. The depth information DEP for the image displayed by the display panel 300 corresponding to the morphing member 412 that is transformed more may have a lower level or lower grayscale information.

In the embodiments shown in FIG. 7 to FIG. 14, the morphing member 412 may include at least one among a piezoelectric film and an electroactive polymer.

A material for the piezoelectric film may include a Rochelle salt, barium titanate, etc., having a good piezoelectric effect. The piezoelectric film has a property of being bent when supplied with a voltage. Thus, the morphing member 412 including a piezoelectric film may be transformed as explained above, so that the height of the display panel 300 may be easily controlled.

The electroactive polymer has a property of being physically transformed such as expanding, shrinking, or bending, when supplied with a voltage. When an imbalance of ion concentration according to positions of the electroactive polymer is generated, a surface at one side may shrink or expand more, so that the object made of an electroactive polymer may be bent in one direction. Therefore, if such electroactive polymer is used as a material of a morphing member 412 according to the aforementioned embodiments, the morphing member 412 may be transformed like the previous embodiments so that the height of the display panel 300 may be easily controlled.

As such, if a piezoelectric film or an electroactive polymer is used as a material of the morphing member 412, the morphing member 412 may be more easily transformed like the aforementioned embodiments, and the observer may perceive further improved quality of a stereoscopic effect.

Figure 15:
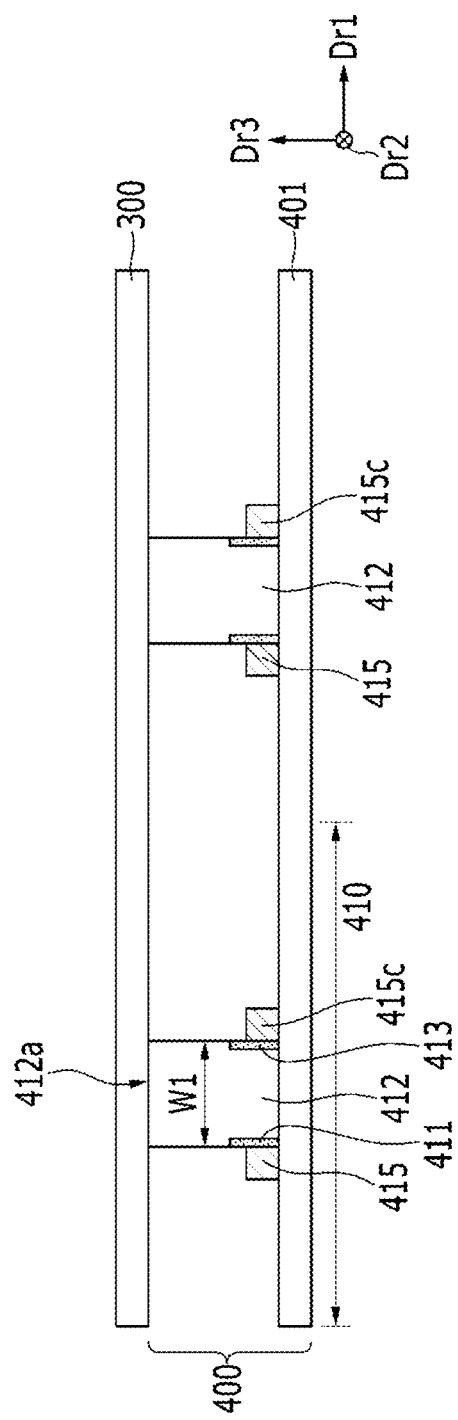
FIG. 15 is a cross-sectional view of a morphing driver and a display panel corresponding to the morphing driver according to an exemplary embodiment.
Figure 16:
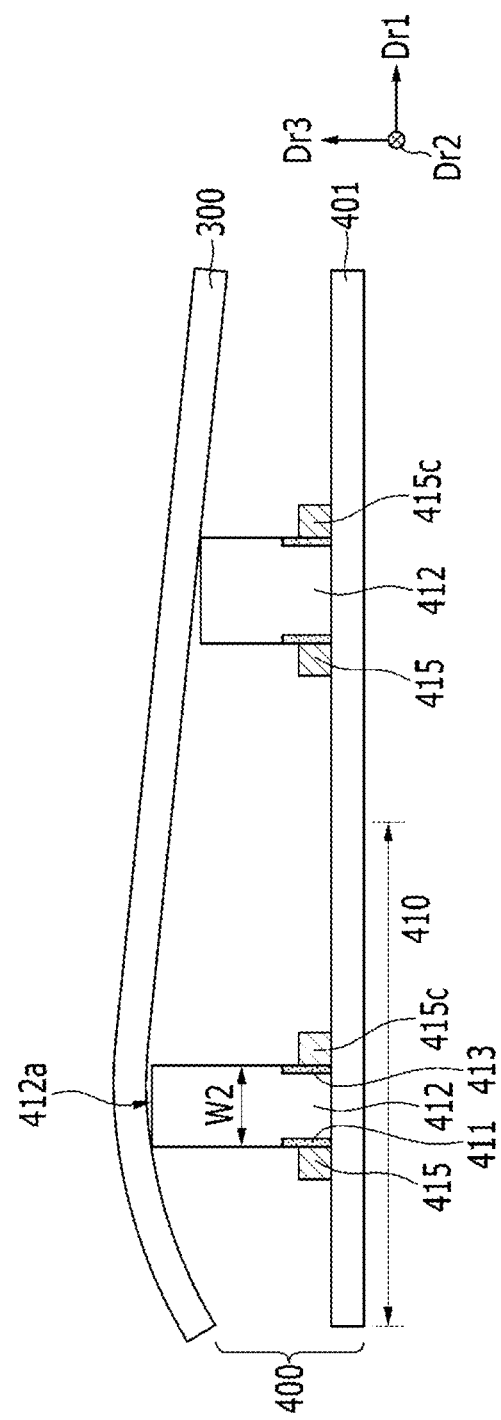
FIG. 16 is a drawing that shows a state of a display panel that is transformed by a morphing driver according to an exemplary embodiment as shown in FIG. 15.

Next, referring to FIG. 15 and FIG. 16 along with FIG. 6 explained above, a detailed structure of a morphing driver 400 according to an exemplary embodiment is described. The same description about the same elements as in the aforementioned exemplary embodiment will be omitted.

FIG. 15 is a cross-sectional view of a morphing driver and a display panel corresponding to the morphing driver according to an exemplary embodiment, and FIG. 16 is a drawing that shows a state of a display panel that is transformed by a morphing driver according to an exemplary embodiment as shown in FIG. 15.

Referring to FIG. 15, a morphing driver 400 according to the present embodiment may have substantially the same structure and configuration as the previously described embodiment as shown in FIG. 13. FIG. 15 shows an example in which the first driving electrode 411 is not disposed on an entire area of the first surface of the morphing member 412 but disposed on only a portion of the first surface, and in which the second driving electrode 413 is not disposed on an entire area of the second surface of the morphing member 412 but disposed on only a portion of the second surface, but the inventive concept is not limited thereto. Alternatively, the first driving electrode 411 or the second driving electrode 413 may be disposed on an entire area of the first surface or the second surface of the morphing member 412.

Alternatively, only the first driving electrode 411 of the morphing driver 400 may be supplied with a voltage via the switching element 415, and the second driving electrode 413 may be directly supplied with a common voltage like the embodiments shown in FIG. 7 to FIG. 12.

The shape of the morphing member 412 shown in FIG. 15 is a state in which the morphing driver 400 does not operate, that is, in an original state. In the original state, an upper end portion 412a of each morphing member 412 may support the display panel 300 at a uniform height.

Referring to FIG. 16, the length in the third direction Dr3 of the morphing member 412 supplied with a voltage may be changed so that the morphing member 412 may be transformed. For example, the morphing member 412 supplied with a voltage may be elongated in the third direction Dr3 so that a height of an upper end portion 412a of the morphing member 412 may rise. Therefore, the height of the display panel 300 in the third direction Dr3 corresponding to each of the morphing members 412 may rise along with the morphing member 412. The greater the difference between the depth data voltage applied to the morphing member 412 and the common voltage is, the greater the transformation or morphing degree of the morphing member 412 is, so that the display panel 300 corresponding to the morphing member 412 may rise more in the third direction Dr3. The depth information DEP for the image displayed by the display panel 300 corresponding to the more transformed morphing member 412 may have a higher level or higher grayscale information.

When the morphing member 412 is elongated in the third direction Dr3, a length in the second direction Dr2 of the morphing member 412 may also be elongated, and, in this case, a length or width in the first direction Dr1 of the morphing member 412 may be reduced. That is, a width W2 in the first direction Dr1 of the morphing member 412 that is supplied with a voltage and elongated in the third direction Dr3 may be less than a width W1 in the first direction Dr1 of the morphing member 412 in the original state. Owing to such transformation, an entire volume of the morphing member 412 may be changed. In addition, an area of a surface parallel to the third direction Dr3 of the morphing member 412 may increase, and an area of a surface perpendicular to the third direction Dr3 may decrease. Such morphing member 412 may have elasticity, and the first driving electrode 411 and the second driving electrode 413 that are connected to the morphing member 412 may have flexibility.

In the embodiments as shown in FIG. 15 and FIG. 16, the morphing member 412 may include an electroactive polymer material. Particularly, when the electroactive polymer is supplied with a voltage, Maxwell stress owing to dielectric polarization is generated, and the electroactive polymer is compressed in the first direction Dr1, which is a thickness direction. Accordingly, an expansion in an area direction including the third direction Dr3 of the electroactive polymer may occur. By using such electroactive polymer as a material of the morphing member 412, the morphing member 412 may be transformed as shown in FIG. 15 and FIG. 16, and accordingly, a height of the display panel 300 may be controlled.

Figure 17:
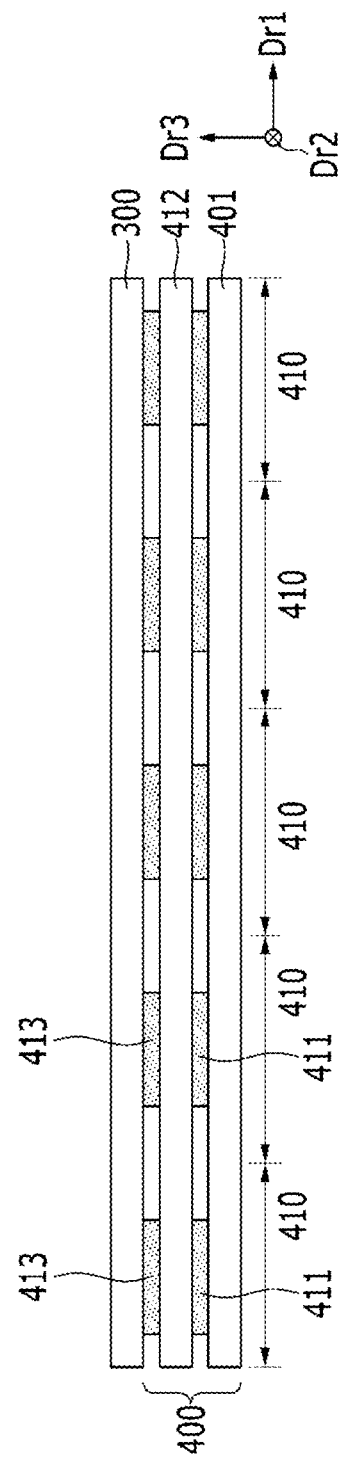
FIG. 17 is a cross-sectional view of a morphing driver and a display panel corresponding to the morphing driver according to an exemplary embodiment.
Figure 18:
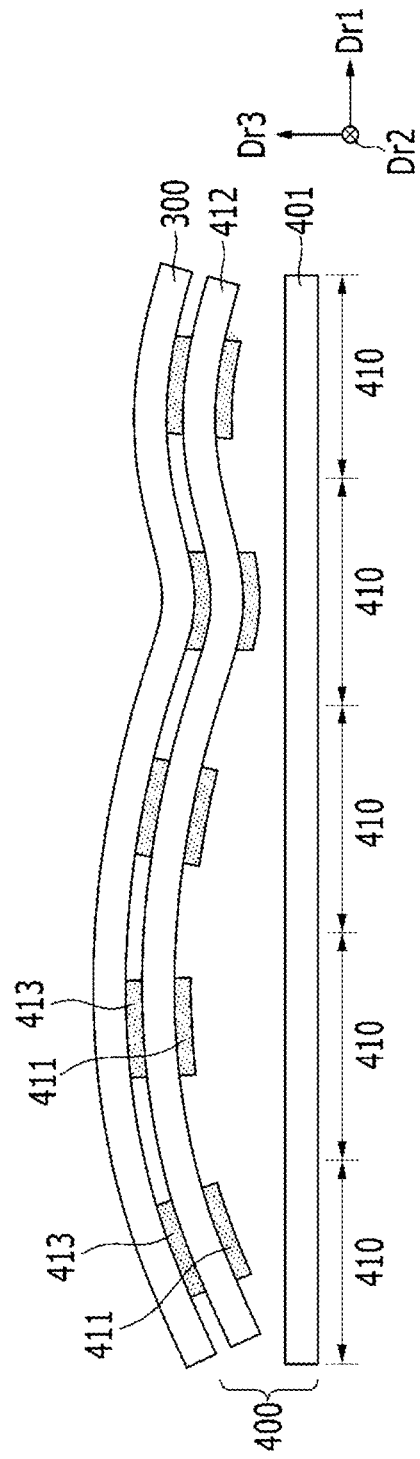
FIG. 18 is a drawing that shows a state of a display panel that is transformed by a morphing driver according to an exemplary embodiment as shown in FIG. 17.
Figure 19:
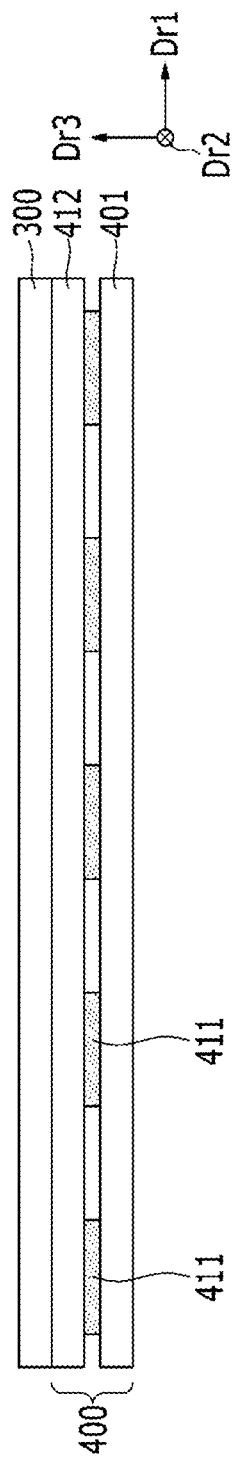
FIG. 19 is a cross-sectional view of a morphing driver and a display panel corresponding to the morphing driver according to an exemplary embodiment.

Next, referring to FIG. 17 to FIG. 19 along with FIG. 6, a detailed structure of a morphing driver 400 according to an exemplary embodiment is described. The same description about the same elements as in the aforementioned exemplary embodiments will be omitted.

FIG. 17 is a cross-sectional view of a morphing driver and a display panel corresponding to the morphing driver according to an exemplary embodiment, FIG. 18 is a drawing that shows a transformed state of a display panel by a morphing driver according to an exemplary embodiment as shown in FIG. 17, and FIG. 19 is a cross-sectional view of a morphing driver and a display panel corresponding to the morphing driver according to an exemplary embodiment.

Referring to FIG. 17, the morphing driver 400 according to an embodiment is substantially the same as in aforementioned embodiments, but morphing members 412 of a plurality of adjacent morphing units 410 may be connected with each other. That is, morphing members 412 connected to each other in a body may be disposed in a plurality of morphing units 410. A pair of the first driving electrode 411 and the second driving electrode 413 may be disposed in each of the morphing units 410, and the transformation degree of the morphing member 412 may be controlled independently per morphing unit 410.

FIG. 17 shows a state in which the morphing driver 400 does not operate, that is, an original state, and FIG. 18 shows a state in which a driving signal is applied to the morphing driver 400 and the morphing member 412 is transformed.

Referring to FIG. 18, the first driving electrode 411 disposed in each of the morphing units 410 is supplied with the corresponding depth data voltage, thereby the transformation state of the morphing member 412 disposed in each of the morphing units 410 may be controlled. The height in the third direction Dr3 of the morphing member 412 may be differently controlled according to the position of the morphing member 412 by controlling the depth data voltage applied to the first driving electrode 411, as shown in FIG. 18. Accordingly, the height in the third direction Dr3 of the display panel 300 may be differently controlled according to the position of the display panel 300 in the first direction Dr1 or in the second direction Dr2, and thereby, a stereoscopic effect of an image may be represented physically and realistically.

Referring to FIG. 19, the morphing driver 400 according to the present embodiment is substantially the same as in the aforementioned embodiments as shown in FIG. 17 and FIG. 18, but the second driving electrode 413 may be omitted. In this case, additional electrodes having the same function as the second driving electrode may be further disposed between the morphing driver 400 and the display panel 300.

Next, referring to FIG. 20 to FIG. 22 along with FIG. 1 to FIG. 5 explained above, a display device including a morphing driver 400 according to an exemplary embodiment will now be described.

Figure 20:
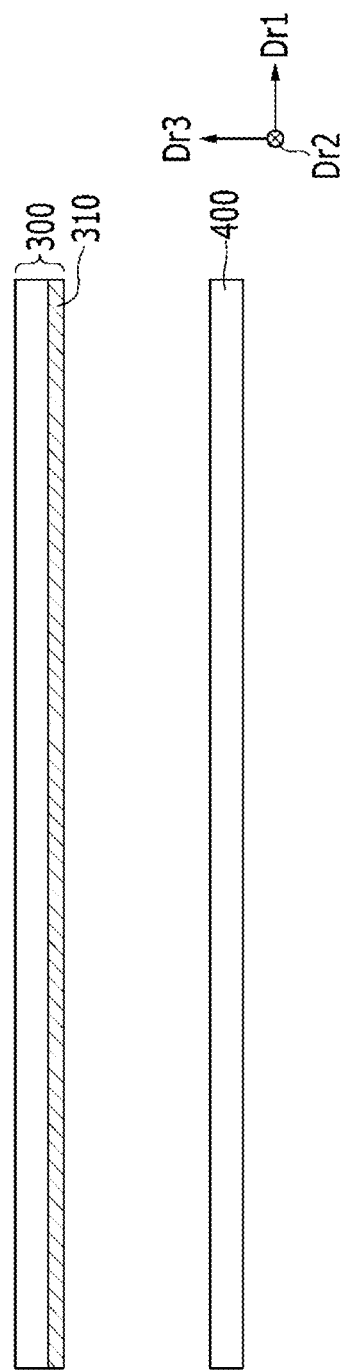
FIG. 20 is a cross-sectional view of a morphing driver and a display panel corresponding to the morphing driver according to an exemplary embodiment.
Figure 21:
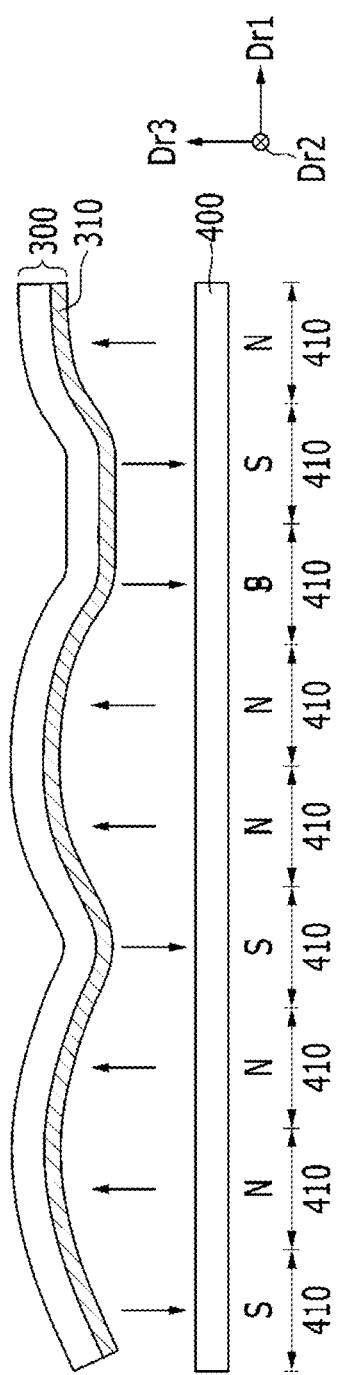
FIG. 21 is a drawing that shows a state of a display panel that is transformed by a morphing driver according to an exemplary embodiment as shown in FIG. 20.
Figure 22:
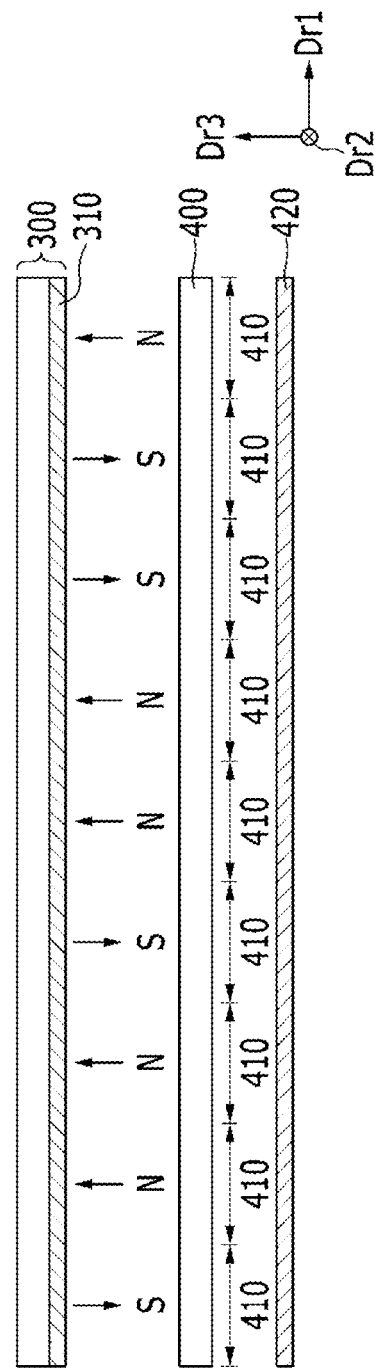
FIG. 22 is a cross-sectional view of a morphing driver and a display panel corresponding to the morphing driver according to an exemplary embodiment.

FIG. 20 is a cross-sectional view of a morphing driver and a display panel corresponding to the morphing driver according to an exemplary embodiment, FIG. 21 is a drawing that shows a state of a display panel that is transformed by a morphing driver according to an exemplary embodiment as shown in FIG. 20, and FIG. 22 is a cross-sectional view of a morphing driver and a display panel corresponding to the morphing driver according to an exemplary embodiment.

Referring to FIG. 20, a morphing driver 400 according to an exemplary embodiment may generate a magnetic field according to the depth information DEP or the output depth signal D_DEP. The morphing driver 400 may exhibit magnetism of S polarity or N polarity according to the depth information DEP or the output depth signal D_DEP, and an intensity of a magnetic field for a same polarity of magnetism may be different. For example, referring to FIG. 20, a magnetic field of the respective polarities may be generated for each of the morphing units 410, and the intensity of the magnetic field may be controlled according to the depth information DEP.

The surface of the display panel 300 opposing the morphing driver 400 may exhibit magnetism of a uniform polarity. For this, the display panel 300 may include a magnetic element 310, the nearest portion of which has a polarity of S or N.

FIG. 20 shows an original state in which the morphing driver 400 does not exhibit magnetism.

Referring to FIG. 21, a magnetic field is generated from each of the morphing units 410 of the morphing driver 400, then each portion of the display panel 300 corresponding to each of the morphing units 410 experiences a repulsive force or an attractive force according to the positions, and accordingly, positions or heights in the third direction Dr3 of portions of the display panel 300 may be changed. For example, in the case that a polarity of the lower portion of the magnetic element 310 of the display panel 300 is N, an attractive force acts between the morphing unit 410 of the morphing driver 400 generating a magnetic field of S polarity and the display panel 300, and as a result, the display panel 300 is pulled down. In addition, a repulsive force acts between the morphing unit 410 of the morphing driver 400 generating a magnetic field of N polarity and the display panel 300, and as a result, the display panel 300 is pushed upward.

The magnetic element 310 of the display panel 300 may generate a magnetic field with a constant polarity, and a magnetic field according to the depth information DEP is generated by the morphing unit 410 of the morphing driver 400. In the case that the depth information DEP has a relatively higher level or higher grayscale information, a magnetic field having the same polarity as the polarity of the magnetic element 310 is generated by the morphing unit 410. Therefore, a repulsive force may act between the display panel 300 and the morphing driver 400. In addition, as the depth information DEP represents the higher level, the intensity of the magnetic field generated by the morphing unit 410 may be further increased. On the contrary, in the case that the depth information DEP has a relatively lower level or lower grayscale information, a magnetic field having an opposite polarity to the polarity of the magnetic element 310 is generated by the morphing unit 410. Therefore, an attractive force may act between the display panel 300 and the morphing driver 400. In addition, as the depth information DEP represents the lower level, the intensity of the magnetic field generated by the morphing unit 410 may be further increased.

As such, as the morphing driver 400 generates a magnetic field depending on the depth information DEP, positions or heights in the third direction Dr3 of portions of the display panel 300 that is disposed over the morphing driver 400 may be changed, and as a result, height differences according to positions of an image displayed by the display panel 300 are generated. Therefore, the depth information DEP may be materially represented on the display surface 301 of the display panel 300, and accordingly, an observer may perceive a physical and realistic stereoscopic effect.

Referring to FIG. 22, the structure and operation of the morphing driver 400 according to the present embodiment is substantially the same as in the embodiments shown in FIG. 20 and FIG. 22, but a display device according to the present embodiment may further include a magnetic element 420 disposed below the morphing driver 400. That is, the morphing driver 400 may be disposed between the magnetic element 420 and the magnetic element 310 of the display panel 300.

The magnetic element 420 may generate a magnetic field with a uniform polarity along the third direction Dr3. A polarity of a magnetic field generated by a portion of the magnetic element 310 of the display panel 300 facing the morphing driver 400 may be the same as or different from a polarity of a magnetic field generated by a portion of the magnetic element 420 facing the morphing driver 400. In the case the two polarities of the magnetic fields by the portion of the magnetic element 310 and the portion of the magnetic element 420 are different from each other, an attractive force acts consistently between the display panel 300 and the magnetic element 420. In the case that the two polarities of the magnetic fields by the portion of the magnetic element 310 and the portion of the magnetic element 420 are the same as each other, a repulsive force acts consistently between the display panel 300 and the magnetic element 420.

As such, the attractive force or the repulsive force that the magnetic element 420 applies to the display panel 300 may be added to the attractive force or the repulsive force applied to the display panel 300 by the morphing driver 400 according to positions of the display panel 300, and accordingly, a range of an intensity of the total transforming force applied to the display panel 300 may be controlled. For example, in the case that the magnetic element 420 applies a repulsive force consistently to the display panel 300, the morphing unit 410 generates a magnetic field which applies a repulsive force to the display panel 300, then a portion of the display panel 300 corresponding to the morphing unit 410 may represent depth information DEP which is further closer to an observer.

Now, referring to FIG. 23 to FIG. 26, a method and a structure for generating a magnetic field by the morphing driver 400 will now be described.

Figure 23:
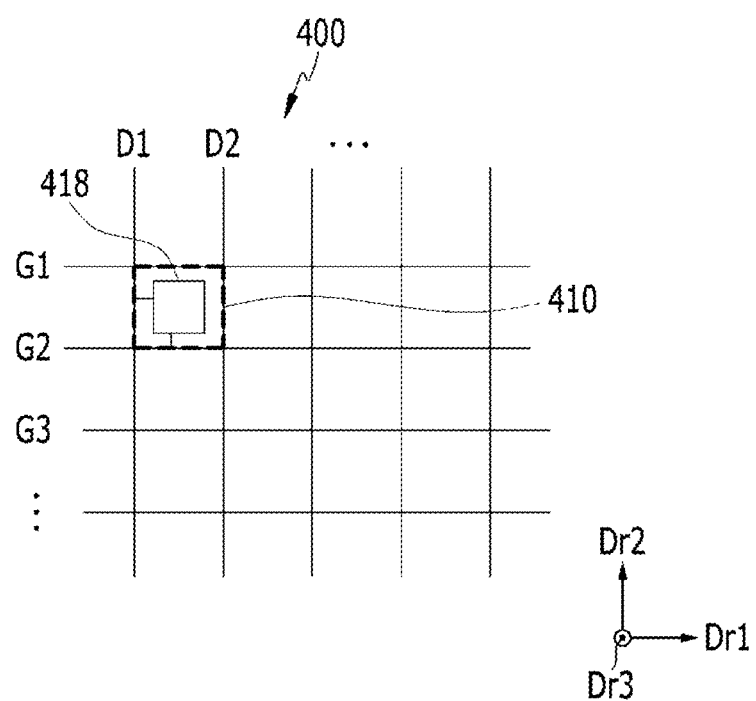
FIG. 23 is a plan layout view of various signal lines and elements included in a morphing driver of a display device according to an exemplary embodiment and connected thereto.
Figure 24:
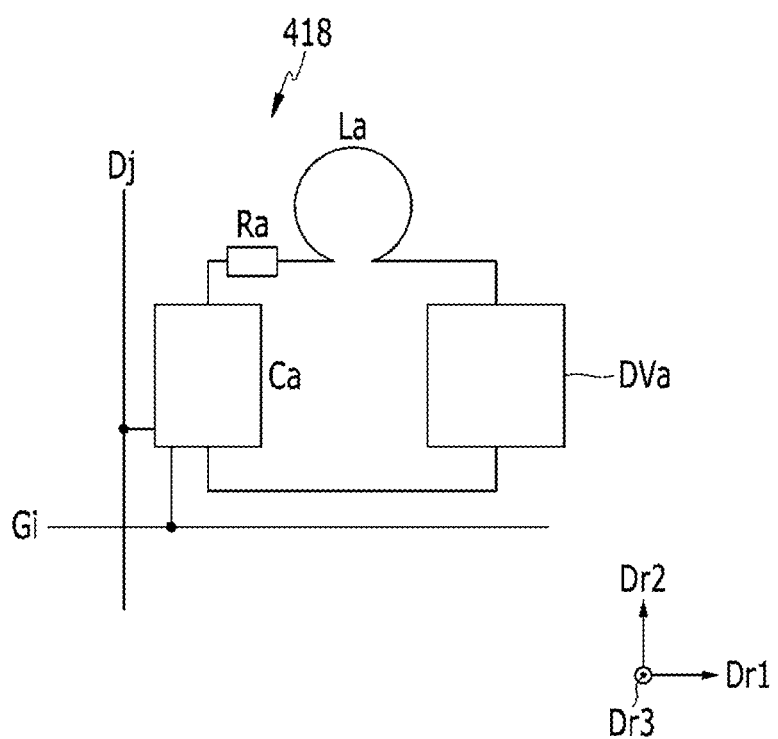
FIG. 24 is a schematic circuit diagram of a magnetic field generator of a morphing driver as shown in FIG. 23, and FIG. 25 and FIG. 26 each show a method of generating a magnetic field by a circuit as shown in FIG. 24.
Figure 25:
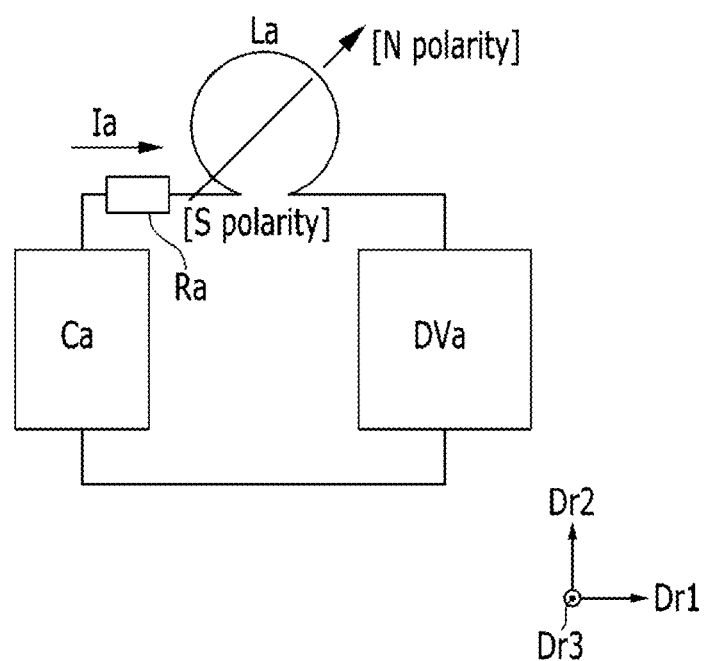
Figure 26:
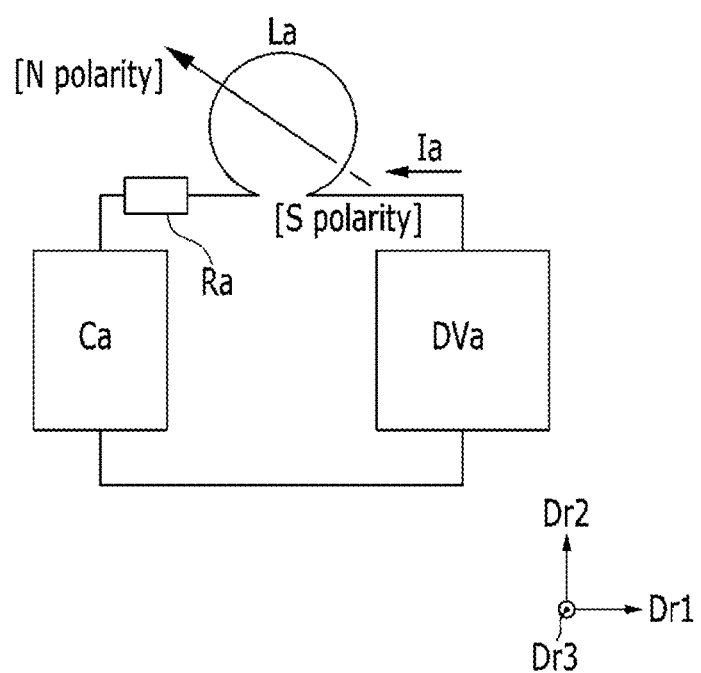

FIG. 23 is a plan layout view of various signal lines and elements connected thereto included in a morphing driver of a display device according to an exemplary embodiment, FIG. 24 is a schematic circuit diagram of a magnetic field generator of a morphing driver as shown in FIG. 23, and FIG. 25 and FIG. 26 each show a method of generating a magnetic field by a circuit as shown in FIG. 24.

Referring to FIG. 23, the morphing driver 400 according to an exemplary embodiment includes a plurality of signal lines including a plurality of gate lines G1-Gn and a plurality of data lines D1-Dm disposed on a substrate (not shown), and a plurality of magnetic generators 418 connected with the signal lines. The morphing unit 410 may include a magnetic generator 418 as shown in FIG. 23, but the inventive concept is not limited thereto.

The gate lines G1-Gn may transmit a gate signal among the driving signals input from the morphing driving controller 540, and the data lines D1-Dm may transmit the depth data voltage among the driving signals input from the morphing driving controller 540.

Referring to FIG. 24, the magnetic generator 418 may include a charging element Ca connected with a gate line Gi and a data line Dj, a resistor Ra, a coil La connected to the resistor Ra, and a power element DVa. The number of winds of the coil La may be 1 or more. The charging element Ca, the resistor Ra, the coil La, and the power element DVa included in the magnetic generator 418 together constitute a circuit. The connecting order of the charging element Ca, the resistor Ra, the coil La, and the power element DVa is not limited to as shown in FIG. 24. For example, the resistor Ra may be disposed and connected between the coil La and the power element DVa.

The charging element Ca may store charges corresponding to a depth data voltage of a data line Dj according to a gate signal transmitted in a gate line Gi. The structure of such charging element Ca is not particularly limited. For example, the charging element Ca may include at least one switching element (not shown) including a gate terminal connected with the gate line Gi and an input terminal connected with the data line Dj, and at least one capacitor (not shown) connected with an output terminal of the switching element.

The power element DVa may output a voltage which is about a half of a chargeable maximum voltage by the charging element Ca. Therefore, it may be easy to control a charging voltage of the charging element Ca to be less or greater than the output voltage of the power element DVa. In addition, a flowing direction of a current Ia of the circuit may be easily controlled. Since the output voltage of the power element DVa is about a half the chargeable maximum voltage of the charging element Ca, a range of a current Ia flowing in a direction of the circuit may be controlled to be similar to a range of a current Ia flowing in an opposite direction of the circuit, and the magnetic field generated from the coil La may have a balance between different polarities.

Referring to FIG. 25, a voltage which is greater than a half of the chargeable maximum voltage at the charging element Ca is stored, and accordingly, a current Ia flows in the clockwise direction, then a magnetic field is generated by the current Ia flowing in the coil La. According to FIG. 25, the polarity of the magnetic field affecting the display panel 300 by the morphing unit 410 of the morphing driver 400 may be S polarity.

Referring to FIG. 26, a voltage of less than a half of the chargeable maximum voltage at the charging element Ca is stored, and accordingly, a current Ia flows in the counter-clockwise direction, then a magnetic field is generated by the current Ia flowing in the coil La. The direction of the magnetic field is opposite to the direction of the magnetic field shown in FIG. 25. According to FIG. 26, the polarity of the magnetic field affecting the display panel 300 by the morphing unit 410 of the morphing driver 400 may be N polarity.

A polarity and/or an intensity of a magnetic field generated by the magnetic generator 418 may vary according to the depth data voltage transmitted in the data lines D1-Dm.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device, comprising:
a display panel comprising a display surface for displaying an image; and
a driver overlapping the display panel and physically controlling a position of at least a portion of the display surface in a first direction which is substantially perpendicular to the display surface according to depth information of input image data so as to provide a stereoscopic effect of an image on the display device,
wherein the driver comprises a magnetic generator,
wherein the magnetic generator comprises a charging element, a resistor, a coil, and a power element, and
wherein the charging element, the resistor, the coil, and the power element constitute a circuit.

2. The display device of claim 1, wherein
the driver comprises magnetic units respectively controlling positions of portions
of the display surface according to the depth information.

3. The display device of claim 2, wherein
the magnetic generator generates a magnetic field which has a polarity and an intensity according to the depth information.

4. The display device of claim 3, wherein
the display panel comprises a first magnetic element generating a magnetic field toward the driver.

5. The display device of claim 4, wherein
the display surface overlaps the circuit.

6. The display device of claim 5, wherein
the power element outputs a voltage which is about a half of a chargeable maximum voltage of the charging element.

7. The display device of claim 6, wherein
the driver comprises a plurality of data lines transmitting a data voltage corresponding to the input image data, and the driver comprises a plurality of gate lines transmitting a gate signal.

8. The display device of claim 4, further comprising
a second magnetic element overlapping the display panel with the driver being positioned between the display panel and the second magnetic element,
wherein the second element generates a magnetic field toward the display panel.

* * * * *